(12) United States Patent
Camp et al.

(10) Patent No.: US 11,535,530 B2
(45) Date of Patent: Dec. 27, 2022

(54) MEDIA PURIFICATION DEVICES HAVING INTERGRAL FLOW CONTROLLERS

(71) Applicant: Unger Marketing International, LLC, Bridgeport, CT (US)

(72) Inventors: Robert Camp, Bethany, CT (US); Paul Adams, Monroe, CT (US); Stephen Huda, Shelton, CT (US)

(73) Assignee: UNGER MARKETING INTERNATIONAL, LLC, Bridgeport, CT (US)

( * ) Notice: Subject to any disclaimer, the term of this patent is extended or adjusted under 35 U.S.C. 154(b) by 70 days.

(21) Appl. No.: 17/065,018

(22) Filed: Oct. 7, 2020

(65) Prior Publication Data

US 2021/0024380 A1 Jan. 28, 2021

Related U.S. Application Data

(60) Division of application No. 15/914,049, filed on Mar. 7, 2018, now Pat. No. 10,829,396, which is a
(Continued)

(51) Int. Cl.
*B01D 24/04* (2006.01)
*B01D 24/16* (2006.01)
(Continued)

(52) U.S. Cl.
CPC .............. *C02F 1/42* (2013.01); *B01D 15/361* (2013.01); *B01D 35/1475* (2013.01);
(Continued)

(58) Field of Classification Search
CPC ...... C02F 1/42; C02F 1/002; C02F 2001/427; C02F 2103/02; C02F 2201/006;
(Continued)

(56) References Cited

U.S. PATENT DOCUMENTS

| 405,518 A | 6/1889 | Wilson |
| 429,384 A | 6/1890 | Manwaring |

(Continued)

FOREIGN PATENT DOCUMENTS

| CA | 2964732 A1 | 10/2015 |
| CH | 351907 A | 1/1961 |

(Continued)

OTHER PUBLICATIONS

"Annulus" Merriam-Webster.com, 2021 https://www.merriam-webster.com/dictionary/annulus (retrieved Jul. 21, 2021).
(Continued)

*Primary Examiner* — Magali P Slawski
*Assistant Examiner* — Angel Olivera
(74) *Attorney, Agent, or Firm* — Cantor Colburn LLP

(57) ABSTRACT

A purification device is provided that includes a porous container, purification media retained in the porous container, and a flow controller integral to the porous container. A purification device is also provided that includes a porous elastic container, purification media, and a flow controller. The porous elastic container has a pocket formed therein. The purification media is compressibly retained in the porous elastic container. The flow controller is elastically retained in the pocket of the porous elastic container.

20 Claims, 24 Drawing Sheets

Related U.S. Application Data continuation-in-part of application No. 14/684,071, filed on Apr. 10, 2015, now Pat. No. 10,414,671.

(60) Provisional application No. 62/628,923, filed on Feb. 9, 2018, provisional application No. 62/468,167, filed on Mar. 7, 2017, provisional application No. 61/977,778, filed on Apr. 10, 2014, provisional application No. 62/065,803, filed on Oct. 20, 2014.

(51) Int. Cl.

| | |
|---|---|
| *C02F 1/42* | (2006.01) |
| *B01D 15/36* | (2006.01) |
| *B01D 35/147* | (2006.01) |
| *B01J 47/024* | (2017.01) |
| *B01J 47/012* | (2017.01) |
| *C02F 1/00* | (2006.01) |
| *B01D 35/30* | (2006.01) |
| *C02F 103/02* | (2006.01) |
| *B08B 3/14* | (2006.01) |

(52) U.S. Cl.
CPC ........... *B01J 47/012* (2017.01); *B01J 47/024* (2013.01); *C02F 1/001* (2013.01); *B01D 24/042* (2013.01); *B01D 24/165* (2013.01); *B01D 35/303* (2013.01); *B01D 2201/306* (2013.01); *B01D 2201/4015* (2013.01); *B01D 2201/4076* (2013.01); *B08B 3/14* (2013.01); *C02F 1/002* (2013.01); *C02F 2001/427* (2013.01); *C02F 2103/02* (2013.01); *C02F 2201/006* (2013.01); *C02F 2201/007* (2013.01); *C02F 2201/008* (2013.01)

(58) Field of Classification Search
CPC .......... C02F 2201/007; C02F 2201/008; C02F 1/28; C02F 1/003; B01D 15/361; B01D 35/1475; B01D 24/042; B01D 24/165; B01D 35/303; B01D 2201/306; B01D 2201/4015; B01D 2201/4076; B08B 3/14; B01J 47/012; B01J 47/024
USPC ........................................................ 210/289
See application file for complete search history.

(56) References Cited

U.S. PATENT DOCUMENTS

| | | | |
|---|---|---|---|
| 661,339 A | 11/1900 | Grever | |
| 1,211,369 A | 1/1917 | Miller | |
| 1,527,046 A | 2/1925 | Ingram | |
| 1,656,896 A | 1/1928 | Astrom | |
| 2,063,086 A | 12/1936 | Fitz Gerald | |
| 2,073,991 A | 3/1937 | Koser | |
| 2,087,157 A * | 7/1937 | Lind | B01J 47/024 141/2 |
| 2,167,225 A | 7/1939 | Van Eweyk | |
| 2,278,488 A | 4/1942 | Ralston | |
| 2,295,708 A | 9/1942 | Raymond | |
| 2,365,221 A | 12/1944 | Shafor | |
| 2,367,260 A | 1/1945 | Beddoes | |
| 2,525,497 A | 10/1950 | Monfried | |
| 2,630,227 A | 3/1953 | Rodwell | |
| 2,633,990 A * | 4/1953 | Simpson et al. | C02F 1/003 210/282 |
| 2,717,614 A | 9/1955 | Palivos | |
| 2,753,302 A | 7/1956 | Cioffi | |
| 3,094,043 A | 6/1963 | Powers et al. | |
| 3,094,807 A | 6/1963 | Dorman | |
| D198,153 S | 5/1964 | Baker | |
| 3,209,915 A | 10/1965 | Gutkowski | |
| 3,266,628 A | 8/1966 | Price | |
| 3,283,903 A | 11/1966 | Muller | |
| 3,319,794 A | 5/1967 | Gross | |
| 3,327,859 A | 6/1967 | Pall | |
| 3,342,340 A | 9/1967 | Shindell | |
| 3,371,792 A | 3/1968 | Weyand et al. | |
| 3,402,126 A | 9/1968 | Cioffi | |
| 3,442,390 A | 5/1969 | Petrucci et al. | |
| 3,497,069 A | 2/1970 | Lindenthal et al. | |
| 3,517,816 A | 6/1970 | Hoppen | |
| 3,561,602 A | 2/1971 | Molitor | |
| 3,642,213 A | 2/1972 | Parkison et al. | |
| 3,746,171 A | 7/1973 | Thomsen | |
| 3,807,298 A | 4/1974 | Luke et al. | |
| 3,960,092 A | 6/1976 | Newman, Jr. | |
| 4,005,010 A | 1/1977 | Lunt | |
| 4,048,030 A | 9/1977 | Miller | |
| 4,048,064 A | 9/1977 | Clark, III | |
| 4,049,548 A | 9/1977 | Dickerson | |
| 4,102,473 A | 7/1978 | Draxler | |
| 4,178,249 A * | 12/1979 | Councill | B01D 24/12 210/281 |
| 4,272,263 A | 6/1981 | Hancock | |
| 4,368,123 A | 1/1983 | Stanley | |
| 4,418,924 A | 12/1983 | Mack | |
| D281,755 S | 12/1985 | Bradley | |
| 4,654,140 A | 3/1987 | Chen | |
| 4,659,460 A | 4/1987 | Muller et al. | |
| 4,728,422 A | 3/1988 | Bailey | |
| 4,793,922 A | 12/1988 | Morton | |
| 4,795,173 A | 1/1989 | Osborne | |
| 4,877,526 A | 10/1989 | Johnson et al. | |
| 4,882,050 A | 11/1989 | Kopf | |
| 4,885,089 A | 12/1989 | Hankammer | |
| 4,932,915 A | 6/1990 | Boris et al. | |
| 4,989,636 A | 2/1991 | Hunter et al. | |
| 5,006,238 A | 4/1991 | Tominaga | |
| 5,040,903 A | 8/1991 | Schramer | |
| D320,273 S | 9/1991 | Heiden | |
| 5,064,534 A | 11/1991 | Busch | |
| 5,087,357 A | 2/1992 | Villa | |
| 5,100,551 A | 3/1992 | Pall et al. | |
| D326,002 S | 5/1992 | Rodriguez | |
| 5,112,503 A | 5/1992 | Raifman | |
| 5,114,572 A | 5/1992 | Hunter et al. | |
| 5,137,632 A | 8/1992 | Morgan, Jr. | |
| 5,154,823 A | 10/1992 | Ma et al. | |
| 5,236,595 A | 8/1993 | Wang et al. | |
| 5,254,242 A | 10/1993 | Van Der Meer | |
| 5,288,412 A | 2/1994 | Voorhees et al. | |
| 5,318,703 A | 6/1994 | Heiligman | |
| 5,378,370 A | 1/1995 | Brane et al. | |
| 5,510,027 A | 4/1996 | Tejeda | |
| D369,544 S | 5/1996 | Culliss | |
| D372,760 S | 8/1996 | Brancazio | |
| D374,064 S | 9/1996 | Brancazio | |
| 5,558,244 A | 9/1996 | Akaike et al. | |
| 5,566,611 A | 10/1996 | Scheucher et al. | |
| 5,595,652 A | 1/1997 | Rainer | |
| 5,605,624 A | 2/1997 | Wright | |
| 5,605,632 A | 2/1997 | Jansen | |
| 5,624,559 A | 4/1997 | Levin et al. | |
| 5,637,214 A | 6/1997 | Kahana | |
| 5,660,863 A | 8/1997 | Nakano et al. | |
| D395,274 S | 6/1998 | Stoll | |
| 5,853,572 A | 12/1998 | Kuennen et al. | |
| D404,086 S | 1/1999 | Harwell | |
| 5,876,600 A | 3/1999 | Matsubara et al. | |
| D414,824 S | 10/1999 | Canoose | |
| D416,790 S | 11/1999 | Bertozzi et al. | |
| 5,985,139 A | 11/1999 | Zoeller | |
| 5,993,656 A | 11/1999 | Cordani | |
| 6,068,761 A | 5/2000 | Yuen | |
| D427,046 S | 6/2000 | Mannix | |
| 6,009,728 A | 8/2000 | Bairischer | |
| 6,099,728 A | 8/2000 | Bairischer | |
| 6,120,686 A | 9/2000 | Bilz | |
| 6,132,612 A | 10/2000 | Bourgeois | |
| 6,136,183 A | 10/2000 | Suzuki et al. | |
| 6,197,193 B1 | 3/2001 | Archer | |
| D441,278 S | 5/2001 | Remar | |

(56) References Cited

U.S. PATENT DOCUMENTS

| | | |
|---|---|---|
| D441,914 S | 5/2001 | Armour |
| 6,241,389 B1 | 6/2001 | Gilmore et al. |
| 6,274,055 B1 | 8/2001 | Zuk, Jr. |
| 6,343,697 B1 | 2/2002 | Hausdorf et al. |
| D455,935 S | 4/2002 | Detiveaux |
| 6,391,097 B1 | 5/2002 | Rosenberg |
| 6,485,639 B1 | 11/2002 | Gannon et al. |
| 6,500,335 B2 | 12/2002 | Janik et al. |
| 6,610,275 B1 | 8/2003 | Owades et al. |
| 6,622,871 B2 | 9/2003 | Gabele et al. |
| D481,442 S | 10/2003 | Liu |
| 6,649,056 B2 | 11/2003 | Fritze |
| 6,685,843 B2 | 2/2004 | Leaverton |
| 6,716,348 B1 | 4/2004 | Morgan |
| 6,764,595 B1 | 7/2004 | Halemba et al. |
| 6,773,588 B2 | 8/2004 | Beeman et al. |
| D496,984 S | 10/2004 | Costa |
| D506,551 S | 6/2005 | Booth et al. |
| 6,966,444 B2 | 11/2005 | Morgan |
| D517,162 S | 3/2006 | Clower |
| 7,014,690 B2 | 3/2006 | Mitsch et al. |
| 7,147,774 B2 | 12/2006 | Jones, III |
| 7,156,994 B1 | 1/2007 | Archer |
| 7,186,338 B2 | 3/2007 | Boisvert |
| 7,243,728 B2 | 7/2007 | Stoesz et al. |
| D552,248 S | 10/2007 | Brawley |
| 7,297,257 B1 | 11/2007 | Terry |
| 7,303,605 B2 | 12/2007 | Zia et al. |
| D562,431 S | 2/2008 | Brune |
| 7,357,337 B2 | 4/2008 | Farrari |
| 7,378,019 B1 | 5/2008 | Currier et al. |
| D580,205 S | 11/2008 | Callahan |
| 7,459,078 B2 | 12/2008 | Klein |
| 7,566,399 B2 | 7/2009 | Kuo et al. |
| D606,420 S | 12/2009 | Shoji |
| 7,625,199 B2 | 12/2009 | Jahn et al. |
| 7,748,755 B2 | 7/2010 | Camp et al. |
| 7,850,859 B2 | 12/2010 | Tanner et al. |
| D640,933 S | 6/2011 | Gallagher |
| 7,963,400 B2 | 6/2011 | Stolarik et al. |
| D649,477 S | 11/2011 | Burns |
| 8,110,103 B2 | 2/2012 | Mormino et al. |
| 8,182,212 B2 | 5/2012 | Parcell |
| D661,339 S | 6/2012 | Thixton |
| 8,323,493 B2 | 12/2012 | Quintel et al. |
| D678,815 S | 3/2013 | Hernandez |
| 8,393,262 B1 | 3/2013 | Molayem |
| 8,464,743 B2 | 6/2013 | King et al. |
| D692,524 S | 10/2013 | Ziser |
| D700,063 S | 2/2014 | Torang |
| 8,815,086 B2 | 8/2014 | Morgan |
| D736,651 S | 8/2015 | Moad |
| D740,915 S | 10/2015 | Harrington |
| D742,997 S | 11/2015 | Sgroi |
| D779,629 S | 2/2017 | Kemper |
| D797,888 S | 9/2017 | Schurmeyer |
| D798,996 S | 10/2017 | Sgroi |
| D804,596 S | 12/2017 | Nichols |
| D815,220 S | 4/2018 | Nichols |
| D828,488 S | 9/2018 | Sgroi |
| 10,088,398 B2 | 10/2018 | Clark et al. |
| D859,626 S | 9/2019 | Hu |
| 10,414,671 B2 | 9/2019 | Hirsch et al. |
| D861,847 S | 10/2019 | Li |
| D870,258 S | 12/2019 | Song |
| D911,486 S | 2/2021 | Sgroi, Jr. |
| 2004/0084361 A1 | 5/2004 | Janik et al. |
| 2004/0140251 A1 | 7/2004 | Hsiao |
| 2004/0149666 A1 | 8/2004 | Leaverton |
| 2004/0251191 A1 | 12/2004 | Darmawan |
| 2005/0199536 A1 | 9/2005 | Koslow |
| 2006/0086656 A1 | 4/2006 | Morgan |
| 2007/0000829 A1 | 1/2007 | Boisvert |
| 2007/0235381 A1 | 10/2007 | Tsai |
| 2008/0000820 A1 | 1/2008 | Mitchell |
| 2008/0011669 A1 | 1/2008 | Morgan |
| 2008/0296210 A1 | 12/2008 | Bittner |
| 2009/0008318 A1 | 1/2009 | Anes et al. |
| 2009/0045583 A1 | 2/2009 | Ropponen |
| 2009/0146421 A1 | 6/2009 | Engdahl |
| 2009/0173284 A1 | 7/2009 | Yoo et al. |
| 2009/0314703 A1 | 12/2009 | Beach et al. |
| 2010/0012590 A1 | 1/2010 | Slark |
| 2010/0084030 A1 | 4/2010 | MacKulin et al. |
| 2010/0126946 A1 | 5/2010 | Morgan |
| 2010/0314301 A1 | 12/2010 | Sloan et al. |
| 2011/0062065 A1 | 3/2011 | McCague |
| 2011/0062066 A1 | 3/2011 | McCague |
| 2011/0089180 A1 | 4/2011 | Kolbasi |
| 2011/0303618 A1 | 12/2011 | Cueman et al. |
| 2012/0085687 A1 | 4/2012 | Simonette |
| 2012/0261325 A1 | 10/2012 | Brown et al. |
| 2012/0261329 A1 | 10/2012 | Quintel |
| 2012/0261359 A1 | 10/2012 | Quintel et al. |
| 2013/0020246 A1 | 1/2013 | Hoots et al. |
| 2013/0025447 A1 | 1/2013 | Crowder |
| 2013/0056406 A1 | 5/2013 | Jacobs et al. |
| 2013/0277298 A1 | 10/2013 | Sanocki et al. |
| 2014/0027361 A1 | 1/2014 | Pennington |
| 2015/0353383 A1* | 12/2015 | Hirsch ............... B01D 35/1475 210/323.1 |
| 2017/0197854 A1 | 7/2017 | Chandler, Jr. et al. |
| 2018/0194646 A1 | 7/2018 | Camp |
| 2019/0070535 A1 | 3/2019 | Patterson et al. |
| 2019/0193006 A1 | 6/2019 | Huda et al. |
| 2020/0001214 A1 | 1/2020 | Adams |
| 2020/0010338 A1 | 1/2020 | Hirsch et al. |

FOREIGN PATENT DOCUMENTS

| | | | |
|---|---|---|---|
| CN | 105709492 A | 6/2016 | |
| DE | 860195 | 12/1952 | |
| DE | 2020929 A1 | 1/1972 | |
| DE | 2364504 A1 | 8/1974 | |
| DE | 2608408 | 11/1976 | |
| DE | 2531850 | 1/1977 | |
| DE | 3207511 A1 * | 9/1983 | ............ B01J 47/012 |
| DE | 3207511 A1 | 9/1983 | |
| DE | 3624414 | 1/1988 | |
| DE | 4136852 A1 | 5/1993 | |
| DE | 4325114 C1 | 11/1994 | |
| DE | M97016860001 | 8/1997 | |
| DE | 69411911 T2 | 2/1999 | |
| DE | 20022322 U1 | 7/2001 | |
| DE | 10305632 A1 | 11/2003 | |
| DE | 202006002737 U1 | 4/2006 | |
| EM | 0003898380031 | 8/2005 | |
| EM | 0003898380032 | 10/2005 | |
| EP | 1221429 A1 | 11/1999 | |
| EP | 1626936 A1 | 2/2006 | |
| EP | 1728767 A1 | 12/2006 | |
| EP | 0676010 B1 | 7/2010 | |
| EP | 2969106 A1 | 1/2016 | |
| EP | 3056276 A2 | 8/2016 | |
| EP | 3070058 A1 | 9/2016 | |
| EP | 3214046 A1 | 9/2017 | |
| EP | 3372558 A1 | 9/2018 | |
| FR | 2636940 A1 | 3/1990 | |
| GB | 525643 A | 9/1940 | |
| GB | 1296051 | 3/1969 | |
| GB | 1404267 | 8/1975 | |
| GB | 1441269 A | 6/1976 | |
| GB | 1543590 | 4/1979 | |
| GB | 2206292 A | 1/1989 | |
| GB | 2222536 A | 3/1990 | |
| JP | H07163820 A | 6/1995 | |
| JP | H1190427 | 4/1999 | |
| JP | 2005138064 A | 6/2005 | |
| NL | 8204637 | 6/1984 | |
| WO | 2003064290 | 8/2003 | |
| WO | 2003064290 A1 | 8/2003 | |
| WO | 2004110938 A2 | 12/2004 | |
| WO | 2005115924 A2 | 12/2005 | |
| WO | 2010010574 | 1/2010 | |

(56) References Cited

FOREIGN PATENT DOCUMENTS

| WO | 2010010574 A1 | 1/2010 |
|---|---|---|
| WO | 2010081075 | 1/2010 |
| WO | 2013103765 A1 | 7/2013 |
| WO | 2015157680 A1 | 10/2015 |
| WO | 2016068746 A1 | 5/2016 |
| WO | 2018067437 A1 | 4/2018 |

OTHER PUBLICATIONS

Susan Selke: "Packaging: Polymers in Flexible Packaging", Encyclopedia of Materials: Science and Technology (Second Edition), Dec. 31, 2001 (Dec. 31, 2001), pp. 6652-6656, XP055742846, Retrieved from the Internet: URL:https://www.sciencedirect.com/sdfe/pdf/download/eid/3-s2.0-B0080431526011761/first-page-pdf [retrieved on Oct. 22, 2020].

"Componenti Per Addolcitori/Water Softners Components," ITA/NIG-CAT-801, Dated Apr. 2009, 6 Pages.

Application for Invalidation dated Sep. 28, 2016 in European Community Registration EU 002555425-0002.

Ask Mr Science, How do rainbows work, Oct. 2013, users hubwest.com, blogpost, retrieved Feb. 6, 2020 from <URL:http://users.hubwest.com/hubert/mrscience/science17.html> (Year: 2013).

Canadian Office Action for Application No. 2,997,580. dated Dec. 20, 2019. 3 Pages.

Lustiges Taschenbuch No. 210 (front page, pp. 2, 3, 218, 219, 238, 239, 240,241, published 1995).

OA dated Jul. 23, 2019.

Penquin Filter Pump Industries, "In-Tank & Out-Tank Filtration Systems", https://filterpump.com, Jul. 2010 (Jul. 2010)—refer to BF Bag Filtration Systems.

Walt Disney's Donald Duck No. 378 (Front page, p. 1; published 1987).

Walt Disney's Donald Duck No. 379 (Front page, p. 1 and p. 73; published 1987).

* cited by examiner

| Diffuser Type | open area mm^2 | Flow (Gpm) | Grains/Liters | Improvement To baseline (based on grains) |
|---|---|---|---|---|
| Baseline Single bag | --- | 1.5 | 2397 / 1487 | |
| Flow Controller 2 | Slots | 500 | 1.5 | 2863 / 1860 | 19% |
| Flow Controller 3 | Slots | 250 | 1.5 | 2761 / 1771 | 15% |
| Flow Controller 4 | Holes | 876 | 1.5 | 2854 / 1850 | 19% |
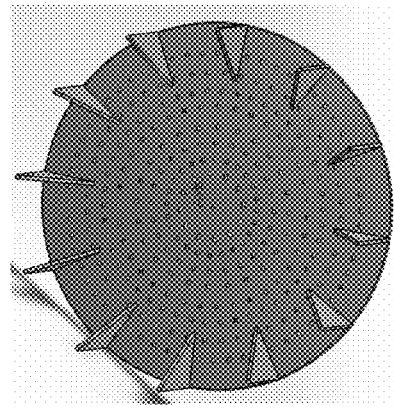
Flow Controller 4
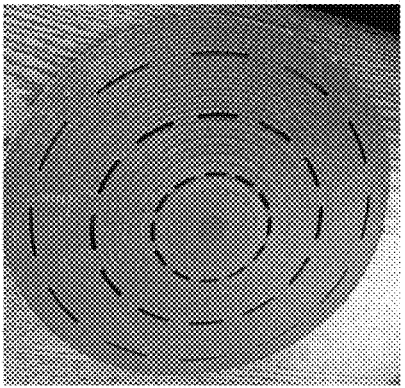
Flow Controller 3
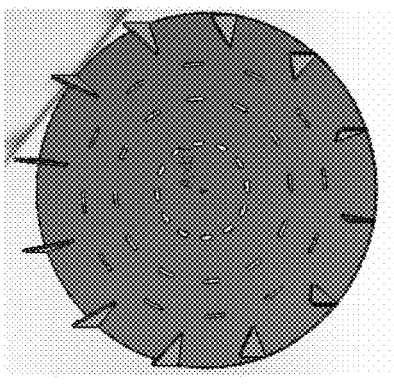
Flow Controller 2
FIG. 9

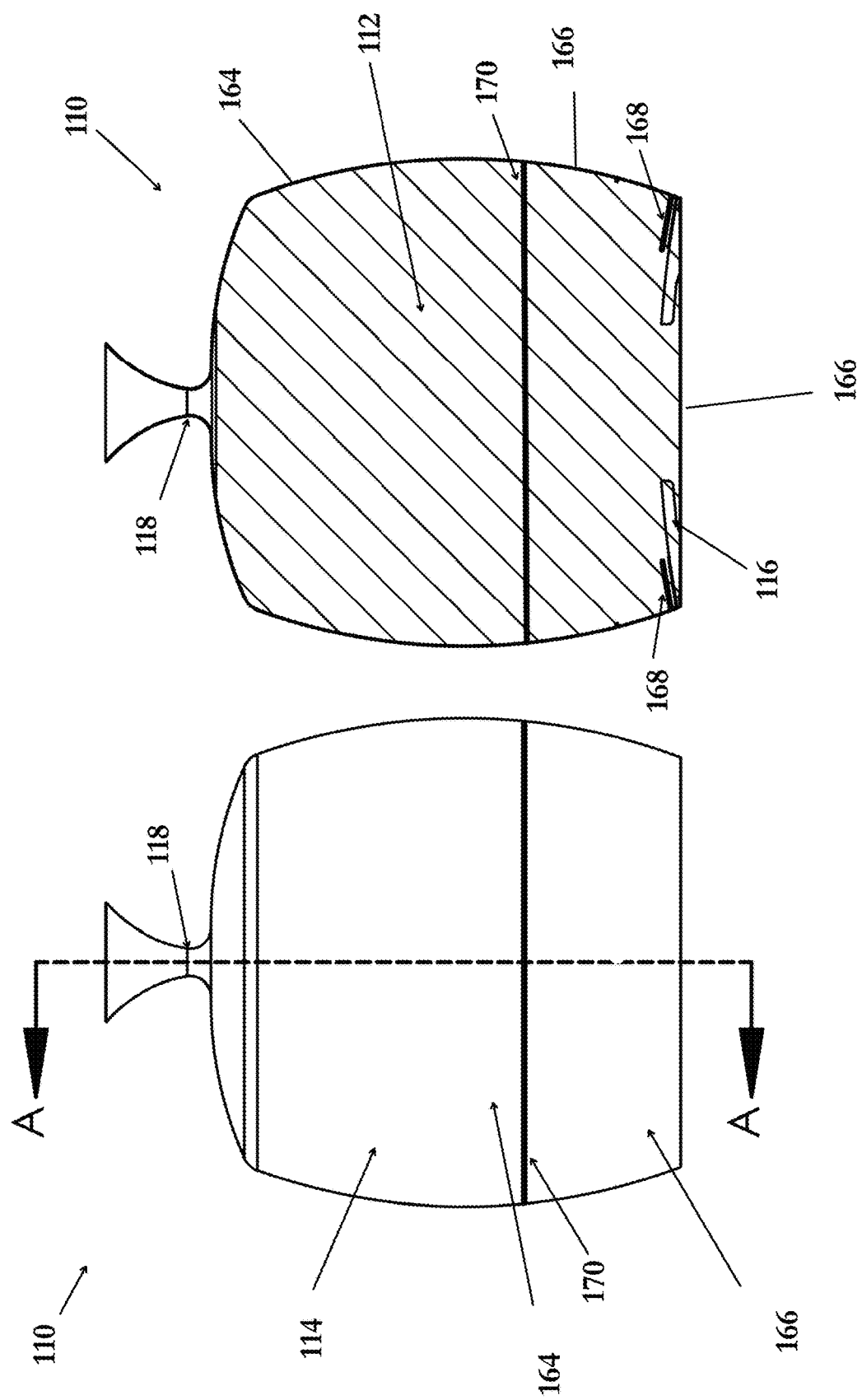

Test 1a

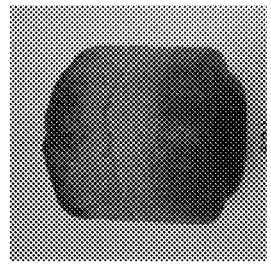
Test 2a
FIG. 25A
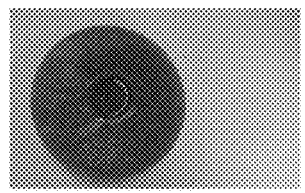
FIG. 25B
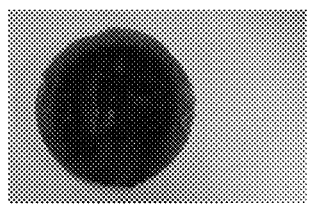
FIG. 25E
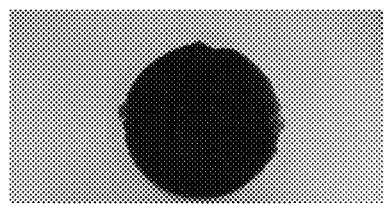
FIG. 25F
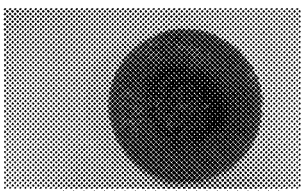
FIG. 25C
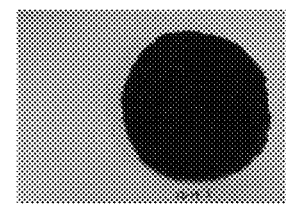
FIG. 25G
FIG. 25D Test 3

FIG. 27

| Water in (ppm) | Water out (ppm) | Test 1<br>Test 1 of Serial No. 14/684,071 (liters) | Test 1a<br>Retest of Test 1 using current resin (liters) | Test 2<br>Test 2 of Serial No. 14/684,071 (liters) | Test 2a<br>Retest of Test 2 using current resin (liters) | Test 3<br>Device 110 in FIGS. 15-23 (liters) |
|---|---|---|---|---|---|---|
| 400 | 10 | 260 | 258 | 344 | 353 | 324 |
| 400 | 20 | 300 | 305 | 365 | 384 | 364 |

| Water in (ppm) | Water out (ppm) | Test 1<br>Test 1 of Serial No. 14/684,071 (grains) | Test 1a<br>Retest of Test 1 using current resin (grains) | Test 2<br>Test 2 of Serial No. 14/684,071 (grains) | Test 2a<br>Retest of Test 2 using current resin (grains) | Test 3<br>Device 110 in FIGS. 15-23 (grains) |
|---|---|---|---|---|---|---|
| 400 | 10 | Not available | 1652 | Not available | 2161 | 2033 |
| 400 | 20 | Not available | 1883 | Not available | 2344 | 2272 |

MEDIA PURIFICATION DEVICES HAVING INTERGRAL FLOW CONTROLLERS

CROSS REFERENCE TO RELATED APPLICATIONS

This application is a divisional of U.S. application Ser. No. 15/914,049 filed on Mar. 7, 2018, which claims the benefit of U.S. Provisional Application Ser. No. 62/468,167 filed on Mar. 7, 2017 and claims the benefit of U.S. Provisional Application Ser. No. 62/628,923 filed on Feb. 9, 2018. U.S. application Ser. No. 15/914,049 filed on Mar. 7, 2018 is also a continuation-in-part of U.S. application Ser. No. 14/684,071 filed on Apr. 10, 2015, which claims the benefit of U.S. Provisional Application Ser. No. 61/977,778 filed Apr. 10, 2014 and claims the benefit of U.S. Provisional Application Ser. No. 62/065,803 filed Oct. 20, 2014. The contents of all of which are incorporated by reference herein in their entirety.

BACKGROUND

1. Field of the Invention

The present disclosure is related to media purification devices. More particularly, the present disclosure is related to media purification devices having integral flow controllers.

2. Description of Related Art

The use of pure water in various cleaning applications is well known. One common cleaning application for pure water is the cleaning of windows, cars, buildings, solar panels, and other surfaces. For example, the use of pure water in the form of deionized (DI) water, also known as demineralized (DM) water, has been found to be particularly effective when cleaning smooth or reflective surfaces such as metal, glass, ceramics, tile, marble, plastics, and others. The pure water can reduce the formation water marks and spots, which can be formed by impurities in untreated water that remain on the surface when the water dries.

Many pure water systems use one or more types of purification media alone or in combination with other devices/processes such as, but not limited to, particle filtration, distilling (i.e., distilled water), reverse osmosis, desalination, carbon filtration, microfiltration, ultrafiltration, ultraviolet oxidation, electrodialysis, others, and any combinations thereof.

Some pure water systems improve the ease of replacing depleted or spent purification media by providing media purification devices that contain or house the purification media.

Such pure water systems and purification media devices are described in Applicant's own U.S. patent application Ser. Nos. 14/684,071; 29/594,840; 29/544,787; 29/487,620; and Ser. No. 29/487,621, the entire contents of which are incorporated herein by reference.

It has now been determined that there is a continuing need for media purification devices that improve the efficiency and provide for increased utilization of the purification media.

SUMMARY

A purification device is provided that includes a purification media contained within an porous container, which in some embodiments is elastic and/or non-elastic. The device includes an integral flow controller, which is configured to ensure maximized resin utilization.

In other embodiments, the integral flow controller is configured to provide additional back pressure and/or restrictions to flow into/through the purification media as a result of the fluid flow through the device.

In some embodiments, the integral flow controller is in an interior of the porous container—elastic and/or non-elastic. Here, the flow controller is considered to be integral with the container by virtue of it residing within the container. Moreover, in some embodiments, the flow controller can be connected to the interior of the container.

The flow controller—when integral with the interior—can be positioned at a lower interior surface of the media device, with respect to the flow direction, at an upper interior surface, at any location between the upper and lower surfaces, or any combinations thereof.

The integral flow controller—when integral with the interior—can be a rigid member, a flexible member, or combinations of rigid and flexible. For example, in some embodiments, the flow controller can have a flexible outer rim that conforms to imperfections in the system and a rigid central portion.

The integral flow controller—when integral with the interior—can include a pivot preventer, which is configured to maintain the controller substantially perpendicular to the primary flow axis. In some embodiments, pivot preventer includes a number of upstanding edges, with the pivot preventer facing the media in the porous container. In other embodiments, pivot preventer is a continuous or non-continuous rim that faces the media in the container.

In other embodiments, the integral flow controller forms a part of the elastic porous container. For example, the flow controller can be an elastic polymer cured on the porous elastic container in a manner that provides a flow pattern through the media. In other examples, the flow controller can be embossed stitching, patches, stickers, paint, printing, or any other structure of the porous elastic container that has a lower porosity than the remaining regions of the porous elastic container so as to provide the desired media utilization.

In other embodiments, the integral flow controller forms a part of the material of the elastic porous container. Here, the flow controller is considered to be integral with the elastic porous container by virtue it forming part of the elastic porous container. For example, the flow controller can be joined (e.g., sewn, adhered, welded, held, connected, etc.) into an opening in the porous elastic container in a manner that provides the desired media utilization.

A purification device is provided that includes a porous container, purification media retained in the porous container, and a flow controller integral to the porous container.

In some embodiments either alone or together with any one or more of the aforementioned and/or after-mentioned embodiments, the porous container is an elastic porous container and the purification media is compressibly retained in the elastic porous container.

In some embodiments either alone or together with any one or more of the aforementioned and/or after-mentioned embodiments, the flow controller is completely inside the porous container.

In some embodiments either alone or together with any one or more of the aforementioned and/or after-mentioned embodiments, the flow controller is completely outside the porous container.

In some embodiments either alone or together with any one or more of the aforementioned and/or after-mentioned embodiments, the flow controller is partially inside and partially outside the porous container.

In some embodiments either alone or together with any one or more of the aforementioned and/or after-mentioned embodiments, the flow controller is at a water entry side of the porous container and/or at a water exit side of the porous container.

In some embodiments either alone or together with any one or more of the aforementioned and/or after-mentioned embodiments, the flow controller is connected to an interior of the porous container.

In some embodiments either alone or together with any one or more of the aforementioned and/or after-mentioned embodiments, the flow controller is connected to an interior surface of the porous container at a water entry side of the porous container and/or at a water exit side of the porous container.

In some embodiments either alone or together with any one or more of the aforementioned and/or after-mentioned embodiments, the flow controller is a rigid member, a flexible member, or combinations thereof.

In some embodiments either alone or together with any one or more of the aforementioned and/or after-mentioned embodiments, the flow controller is made of a material selected from the group consisting of polypropylene (PP), acrylonitrile butadiene styrene (ABS), polystyrene (PS), polyvinyl chloride (PVC), thermoplastic elastomer (TPE), stainless steel, and any combinations thereof.

In some embodiments either alone or together with any one or more of the aforementioned and/or after-mentioned embodiments, the flow controller has a pivot preventer configured to maintain the flow controller perpendicular to a primary flow axis (A).

In some embodiments either alone or together with any one or more of the aforementioned and/or after-mentioned embodiments, the flow controller forms a part of the porous container.

A purification device is also provided that includes a porous elastic container, purification media, and a flow controller. The porous elastic container has a pocket formed therein. The purification media is compressibly retained in the porous elastic container. The flow controller is elastically retained in the pocket of the porous elastic container.

In some embodiments either alone or together with any one or more of the aforementioned and/or after-mentioned embodiments, the pocket is in an inner surface of the porous elastic container.

In some embodiments either alone or together with any one or more of the aforementioned and/or after-mentioned embodiments, the pocket is in a water entry side of the porous elastic container, at a water exit side of the porous container, or at both the entry and exit sides of the porous container.

In some embodiments either alone or together with any one or more of the aforementioned and/or after-mentioned embodiments, the flow controller stretches the water entry side of the porous elastic container at least 10% and/or stretches the water exit side of the porous elastic container at least 10%.

In some embodiments either alone or together with any one or more of the aforementioned and/or after-mentioned embodiments, the flow controller has a frustoconical shape that tapers upward from the water entry side.

A pure water system is also provided that includes a tank, a cover, an inlet port, and an outlet port configured to define a reservoir. The system includes a purification device received in the reservoir so that water can flow into the inlet port, through the purification device, and out of the outlet port a primary axis of flow (A). The purification device includes a porous container, purification media retained in the porous container, and a flow controller integral to the porous container.

In some embodiments either alone or together with any one or more of the aforementioned and/or after-mentioned embodiments, the porous container is a porous elastic container.

In some embodiments either alone or together with any one or more of the aforementioned and/or after-mentioned embodiments, the flow controller stretches the water entry side of the porous elastic container at least 10%.

In some embodiments either alone or together with any one or more of the aforementioned and/or after-mentioned embodiments, the primary axis of flow is an upward flow direction.

In some embodiments either alone or together with any one or more of the aforementioned and/or after-mentioned embodiments, the flow controller is at a water entry side of the porous container, the water entry side being proximate the inlet port.

A method of purifying water is also provided. The method includes passing water through a porous container, the porous container having purification media retained therein and having a flow controller integral to the porous container, wherein the water passes through the purification media and the flow controller.

In some embodiments either alone or together with any one or more of the aforementioned and/or after-mentioned embodiments, the step of passing the water through the porous container comprises passing the water through an elastic porous container with the purification media compressibly retained therein.

In some embodiments either alone or together with any one or more of the aforementioned and/or after-mentioned embodiments, the step of passing the water through the porous container comprises passing the water through the flow controller that is completely inside the porous container, completely outside the porous container, or partially inside and partially outside the porous container.

In some embodiments either alone or together with any one or more of the aforementioned and/or after-mentioned embodiments, the step of passing the water through the porous container comprises passing the water through the flow controller at a water entry side of the porous container and/or at a water exit side of the porous container.

In some embodiments either alone or together with any one or more of the aforementioned and/or after-mentioned embodiments, the step of passing the water through the porous container comprises passing the water through the flow controller that is connected to an interior of the porous container.

In some embodiments either alone or together with any one or more of the aforementioned and/or after-mentioned embodiments, the step of passing the water through the porous container comprises passing the water through the flow controller that is a rigid member, a flexible member, or combinations thereof.

In some embodiments either alone or together with any one or more of the aforementioned and/or after-mentioned embodiments, the step of passing the water through the porous container comprises passing the water through the flow controller that is made of a material selected from the group consisting of polypropylene (PP), acrylonitrile butadiene styrene (ABS), polystyrene (PS), polyvinyl chloride (PVC), thermoplastic elastomer (TPE), stainless steel, and any combinations thereof.

In some embodiments either alone or together with any one or more of the aforementioned and/or after-mentioned embodiments, the step of passing the water through the porous container comprises passing the water through the flow controller that has a pivot preventer configured to maintain the flow controller perpendicular to a primary flow axis (A).

In some embodiments either alone or together with any one or more of the aforementioned and/or after-mentioned embodiments, the step of passing the water through the porous container comprises passing the water through the flow controller that forms a part of the porous container.

In some embodiments either alone or together with any one or more of the aforementioned and/or after-mentioned embodiments, the step of passing the water through the porous container comprises passing the water through the flow controller that is elastically retained in a pocket of the porous elastic container.

In some embodiments either alone or together with any one or more of the aforementioned and/or after-mentioned embodiments, the step of passing the water through the porous container comprises passing the water through the flow controller elastically retained in the pocket, the pocking being in an inner surface of the porous elastic container, being the pocket is in a water entry side of the porous elastic container, being at a water exit side of the porous container, or at both the entry and exit sides of the porous container.

In some embodiments either alone or together with any one or more of the aforementioned and/or after-mentioned embodiments, the step of passing the water through the porous container comprises passing the water through the flow controller elastically retained in the pocket, where the flow controller stretches the a portion of the porous elastic container at the pocket by at least 10%—the portion being at a water entry side and/or a water exit side of the porous elastic container.

In some embodiments either alone or together with any one or more of the aforementioned and/or after-mentioned embodiments, the step of passing the water through the porous container comprises passing the water through the flow controller elastically retained in the pocket, where the flow controller has a frustoconical shape that tapers upward from the pocket.

The above-described and other features and advantages of the present disclosure will be appreciated and understood by those skilled in the art from the following detailed description, drawings, and appended claims.

BRIEF DESCRIPTION OF THE DRAWINGS

The patent or application file contains at least one photograph executed in color. Copies of this patent or patent application publication with color photograph(s) will be provided by the Office upon request and payment of the necessary fee

FIG. 9 provides a performance comparison of different embodiments flow controllers according to the present disclosure;

FIG. 20 is a side schematic view of the water purification device of FIG. 15;

FIG. 21 is a sectional view of the water purification device of FIG. 20, taken along section A-A;

FIG. 25A-25G are images of a resin usage test using another prior art water purification device;

FIG. 27 is a data table of the results of the resin usage tests.

DETAILED DESCRIPTION

Figure 1:
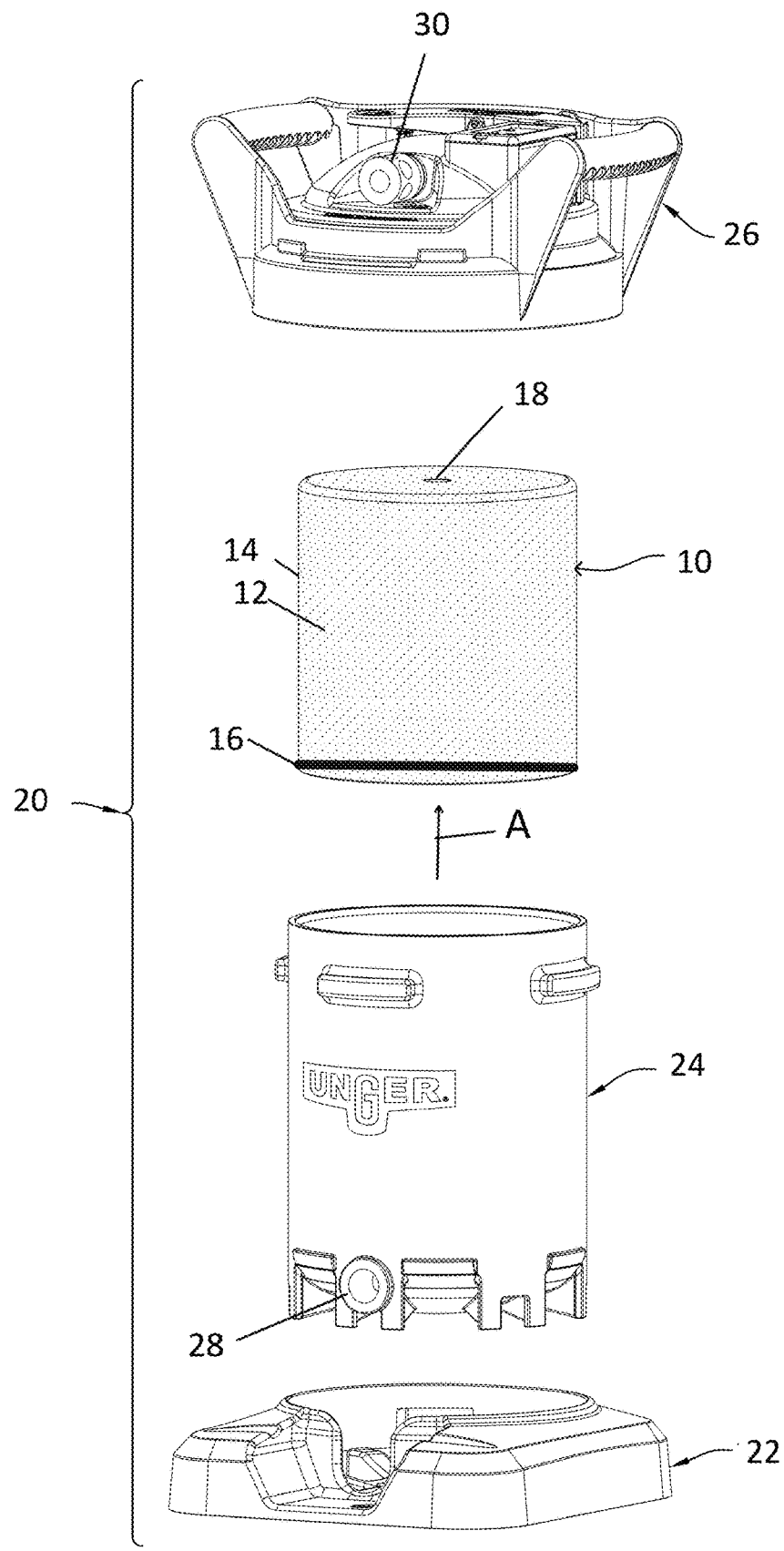
FIG. 1 is a schematic depiction of an exemplary embodiment of a water purification device according to the present disclosure in use with a prior art pure water system.
Figure 2:
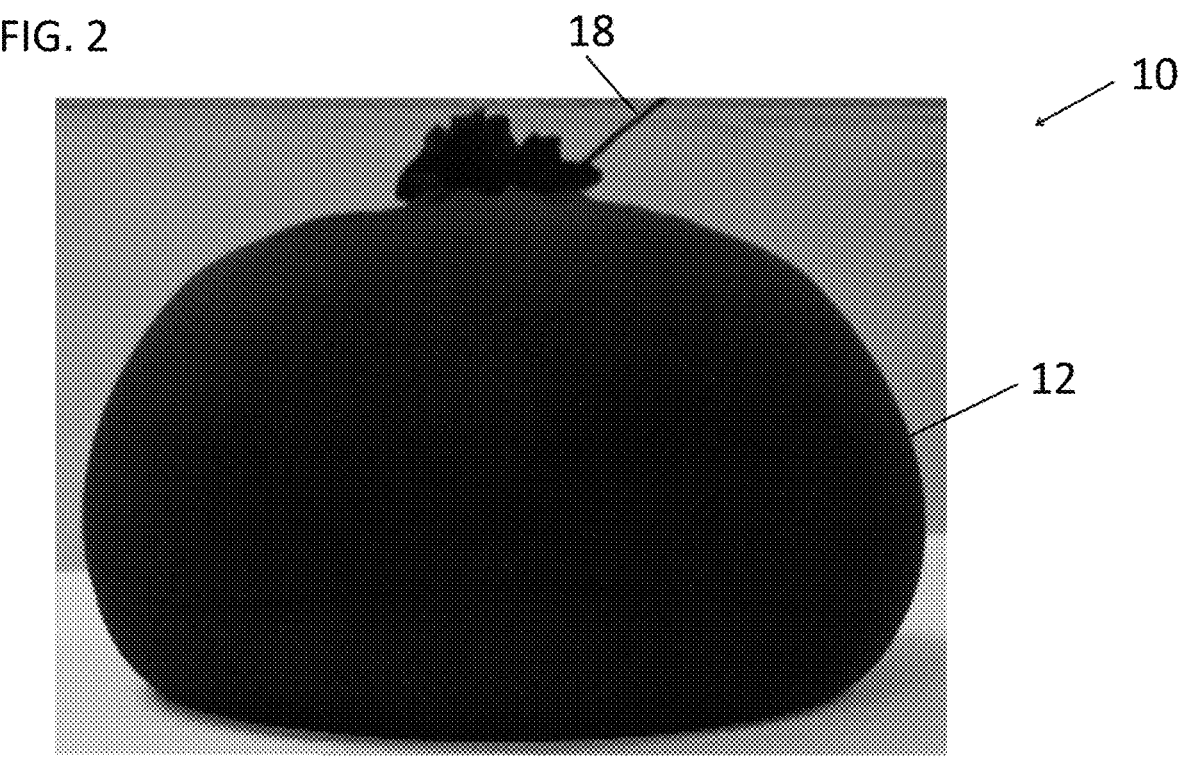
FIG. 2 illustrates a side view of an exemplary embodiment of a water purification device according to the present disclosure when resting on a surface.

Referring to the drawings and in particular to FIGS. 1 and 2, exemplary embodiments of a purification media device 10 according to the present disclosure is shown—by way of example—in use with a pure water system 20.

Advantageously, purification device 10 includes a purification media 12 contained within porous container 14 and has an integral flow controller 16, which is configured to provide a desired media utilization. Simply stated, purification device 10 having integral flow controller 16 is configured to maximize the utilization of media 12 by providing one or more of a flow pattern, compressive forces, increase a length (L) of contact between container 14 and tank 24, and other benefits.

As used herein, the term "integral" shall mean that device 10 has or contains the parts that allow the device to be considered to be a complete unit—where the parts to allow the device to be considered complete include at least media 12, container 14, and controller 16.

Device 10 can be configured in many different ways so as to be considered "integral" within the scope of the present application. For example, device 10 can have controller 16 internal to container 14—with the controller either secured to the container or not. Device 10 can have controller 16 with at least a portion attached or secured to an external portion of container 14. Device 10 can have controller 16 secured to container 14—internal and/or external to the container—so that at least a portion of the controller forms a portion of the container. Device 10 can have controller 16 formed directly on a surface of container 14—an internal and/or external surface. Device 10 can have controller 16 embedded in container 14—an internal and/or external surface. Moreover, device 10 can have any combinations of the aforementioned structures so as to be considered to have an integral controller within the scope of the present application.

In some embodiments, container 14 includes a closure 18 securing the media 12 in the container. In this and/or other embodiments, container 14 can be a porous elastic container. Container 14—when elastic—may be formed by a material formed from a combination of elastane and Nylon. In some such embodiments, container 14 may be formed from a material that has 5%-25% elastane and 75%-95% Nylon, preferably a material formed from between 10%-20 elastane and between 80%-90% Nylon, or with 15% elastane and 85% Nylon being desired, and any subranges therebetween. For example, it is contemplated by the present disclosure for container 14 to be a porous elastic bag.

Of course, it is contemplated by the present disclosure for purification device 10 to find use with other systems. For example and although not shown for purposes of clarity, it is contemplated by the present disclosure for purification device 10 to find use with other systems 20 that include other purification devices and/or processes for example, paper filters, membranes, carbon filters, and others.

It should also be recognized that purification device 10 is discussed as being used to treat or condition water by removing one or more components from the water. Of course, it is also contemplated by the present disclosure for purification device 10 to treat or condition water or any other fluid, as well as to treat or condition by adding one or more components such as, but not limited to, elements, compounds, ions, and others.

Therefore, as used herein, the terms "pure", "purified", and "purification" shall include the removal of one or more components and/or the addition of one or more components from water or any other fluid. The components removed or added can include soluble and/or insoluble materials such as, but not limited to minerals, salts, suspended particles, bacteria, and others, where the soluble components are often referred to as total dissolved solids or TDS.

In the illustrated embodiment, purification device 10 is shown in use with system 20, which includes a base 22, a tank 24, and a cover 26. System 20 has a first or inlet port 28 and a second or outlet port 30. In this manner, system 20 configured to define a reservoir between first and second ports 28, 30 in which purification device 10 is received.

During use, a pressurized water source (not shown) is fluidly connected to first port 28 and a water using device (not shown) is fluidly connected to second port 30. In this manner, water flows into system 20 at first port 28, through purification device 10 along a primary axis of flow (A), and out of the system at second port 30 to the water using device.

In an exemplary embodiment, the pressurized water source is a normal residential or commercial water source having a pressure of approximately 40 to 60 pounds per square inch (psi). Of course, it is contemplated by the present disclosure for purification device 10 to find use with any pressurized water source such as, but not limited to, pumped systems and at any desired pressure. Further, it is contemplated for purification device 10 to be configured for use with a heated fluid source (not shown) such as, but not limited to, heating ventilation and air conditioning (HVAC) systems.

For ease of discussion, purification device 10 is described above by way of example only having an upward flow direction—namely with the pressurized source of water connected to first port 28 located at the bottom of system 20. Of course, it should be recognized that purification device 10 finds equal use with the pressurized source of water connected to second port 30—namely with a reversed flow to that illustrated.

Figure 3:
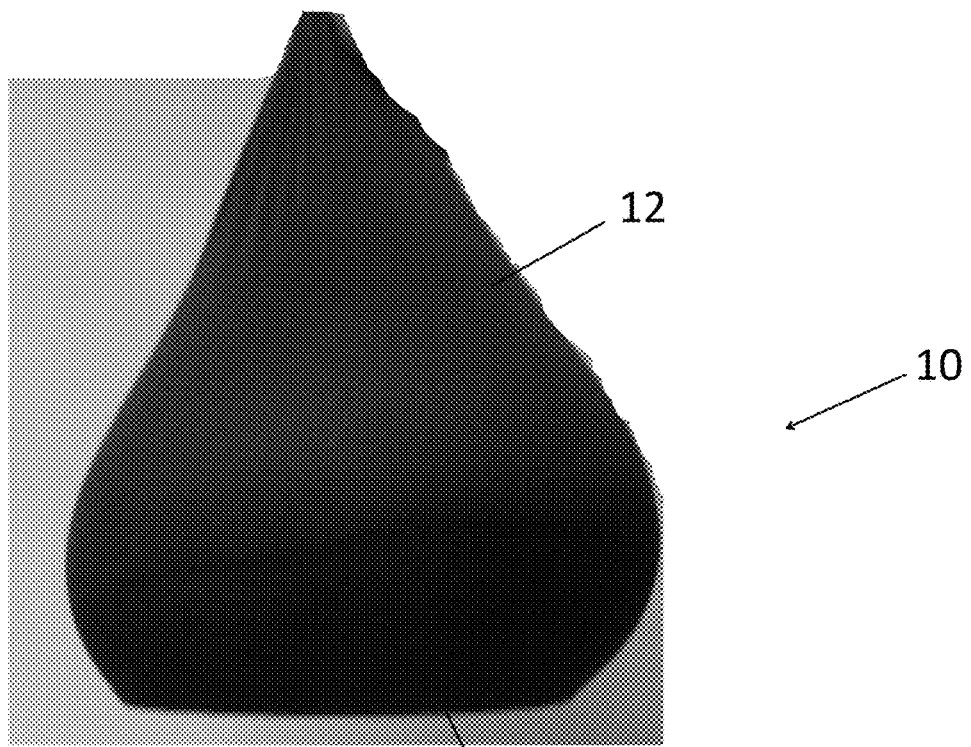
FIG. 3 is a partial side view of the water purification device of FIG. 2 when suspending by the closure.
Figure 4:
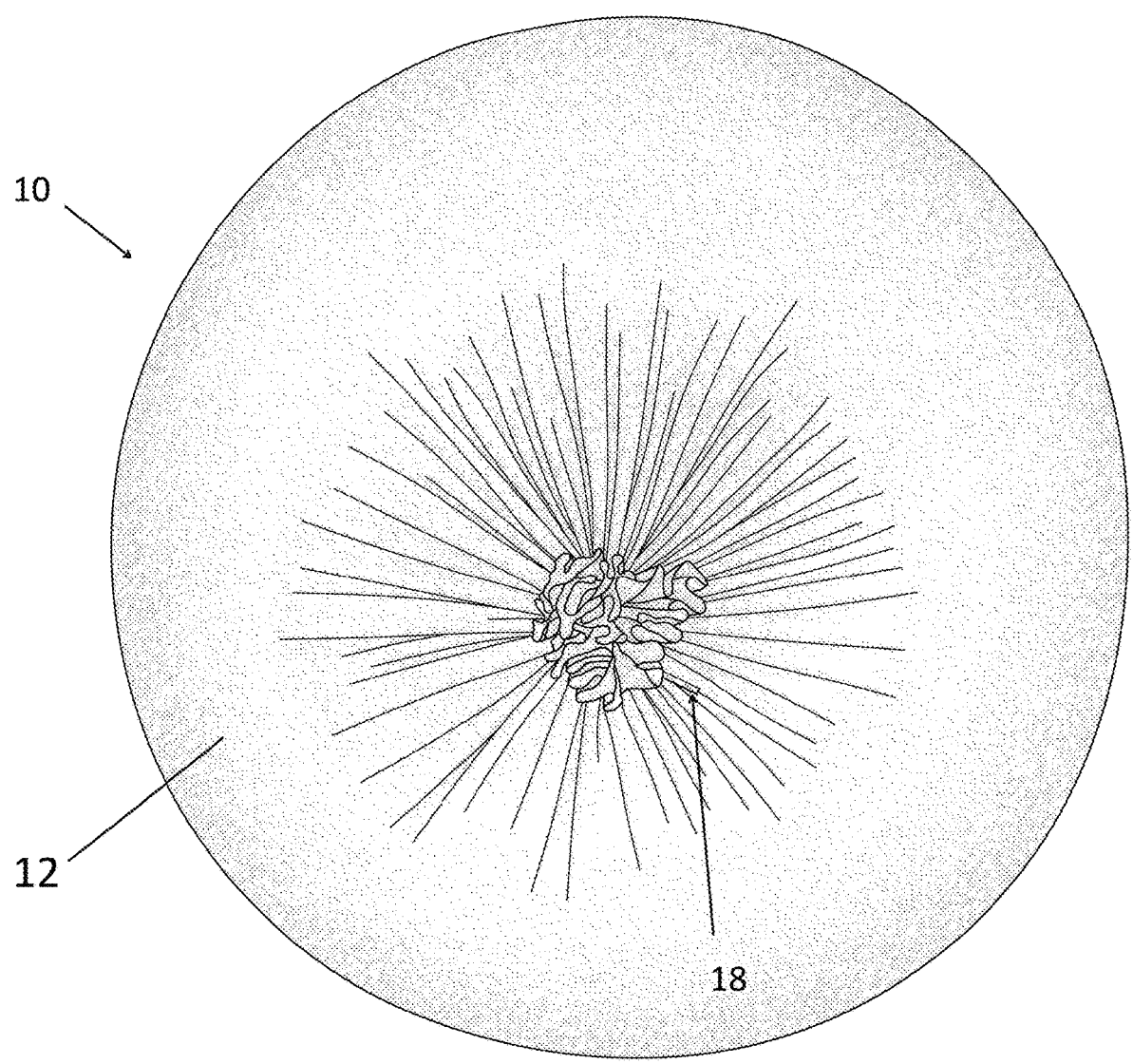
FIG. 4 is a top view of the water purification device of FIG. 2 when resting on a surface.
Figure 5:
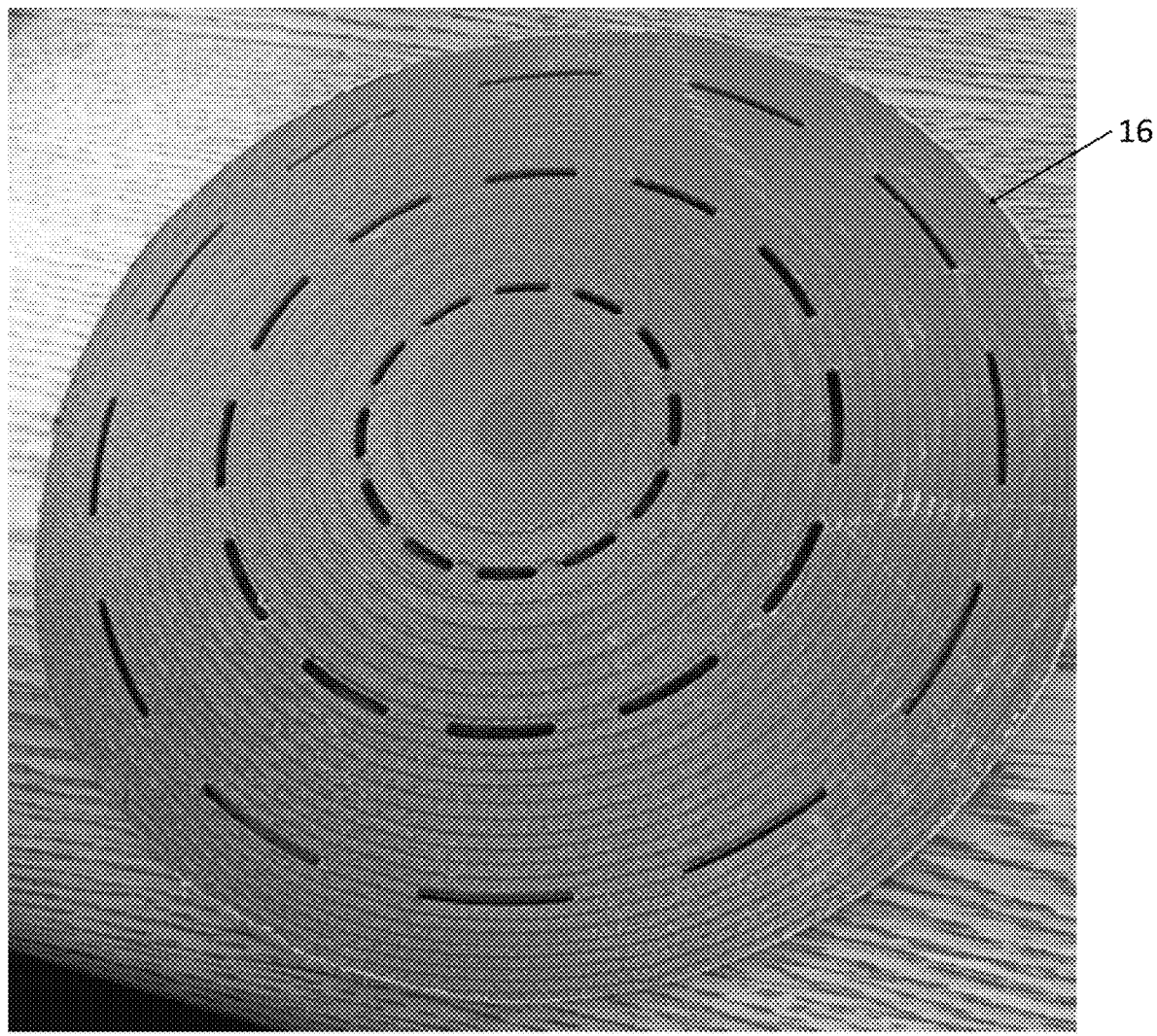
FIGS. 5 through 8 illustrate exemplary embodiments of flow controllers for use with the water purification device according to the present disclosure.

A first exemplary embodiment of purification device 10 is shown in FIGS. 3 through 5. Here, purification device 10 is shown having flow controller 16 interior to container 14.

Flow controller 16 is considered to be integral with container 14 by virtue of the controller residing within the container. In some embodiments, flow controller 16 can be connected to the interior of container 14 at a specific position. The specific position of controller 16 can be at a lower interior surface of container 14, with respect to the flow direction, as in FIG. 3.

Of course, it is contemplated by the present disclosure for the specific position of controller 16 to be at an upper interior surface (not shown) of container 14, at any location between the upper and lower surfaces, and any combinations thereof.

Flow controller 16—when integral with the interior of container 14—can be a rigid member, a flexible member, or combinations of rigid and flexible. For example, in some embodiments, flow controller 14 can have a flexible outer rim that conforms to imperfections in the system 20 and a rigid central portion.

Figure 6:
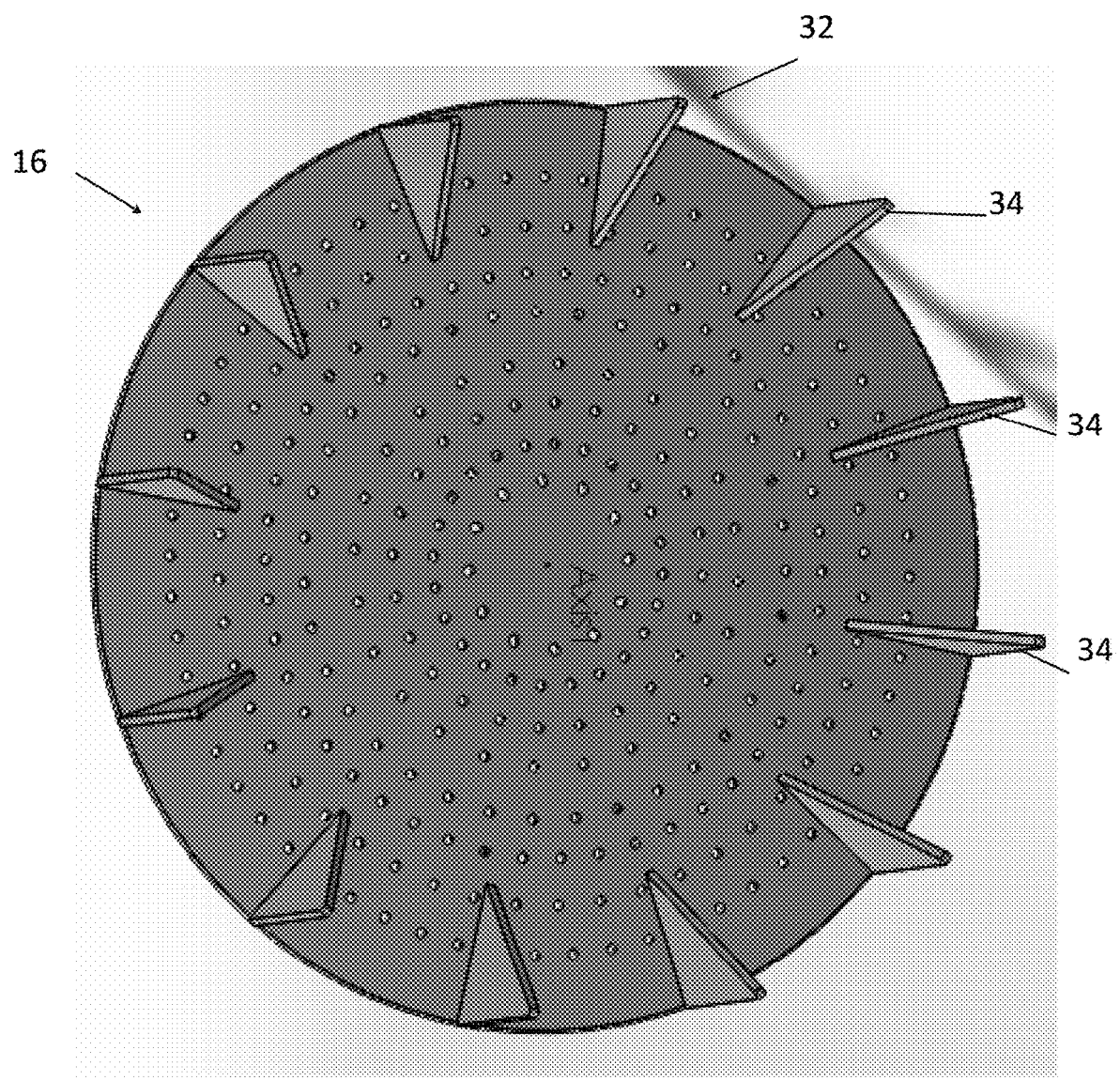
Figure 7:
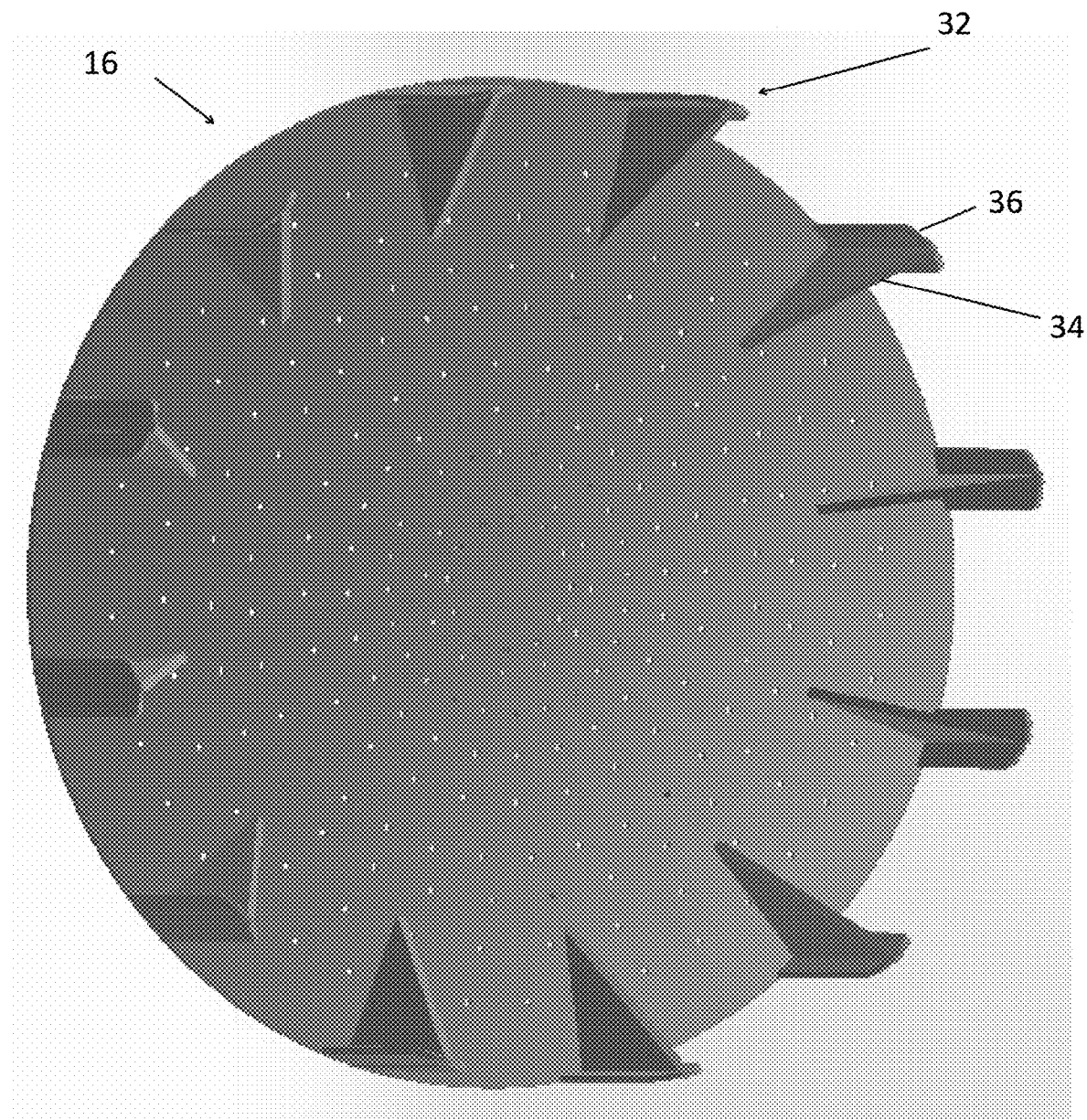
Figure 8:
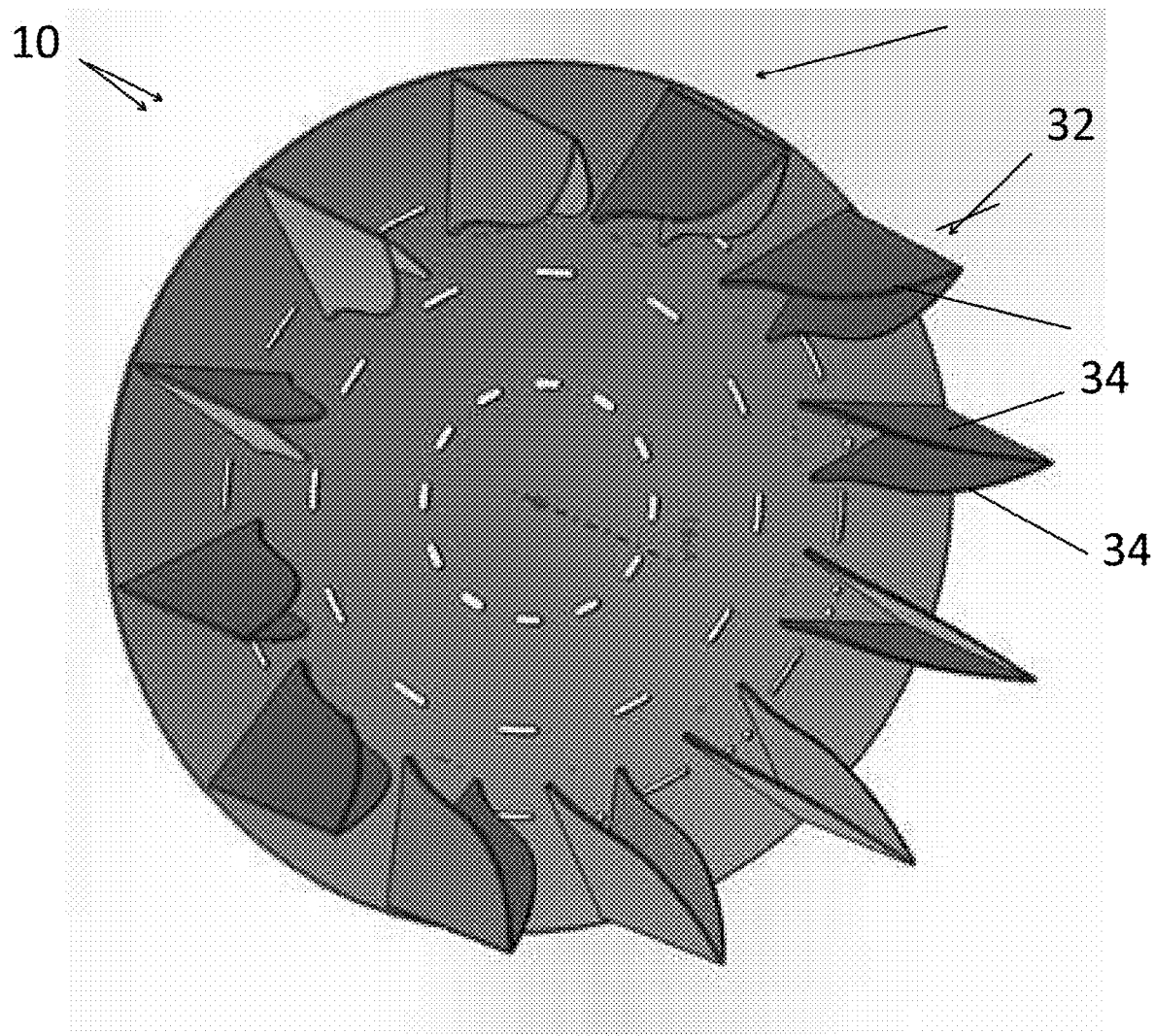

Flow controller 16—when integral with the interior of container 14—can include a pivot preventer 32 as shown in FIG. 6, which is configured to maintain the controller substantially perpendicular to the primary flow axis (A). In some embodiments, pivot preventer 32 includes a number of upstanding edges 34, with the pivot preventer facing media 12 in container 14. In other embodiments as shown in FIG. 7, number of upstanding edges 34 can further include a partial rim 36, with the pivot preventer facing media 12 in container 14. In still other embodiments, pivot preventer 32 can simply have rim 36—where the rim can be discontinuous or continuous around controller 16 (not shown) and where the rim that faces media 12 in container 14. In still further embodiments as shown in FIG. 8, pivot preventers 32 can be a plurality of pairs of edges 34 that further provide a channel for fluid through media 12.

In some embodiments, it is contemplated by the present disclosure for flow controller 16 to form a part of container 14. For example, flow controller 16 can be an elastic polymer cured on container 14 (i.e., interior and/or exterior) in a manner that provides the desired media utilization. In other examples, flow controller 16 can be embossed stitching, patches, stickers, paint, printing, or any other structure on container 14 that has a lower porosity than remaining regions of the container that do not have the flow controller so as to provide the desired media utilization. In other embodiments, flow controller 16 can be joined (e.g., sewn, adhered, welded, etc.) into an opening (not shown) in container 14 in a manner that provides the desired media utilization.

Flow controller 16 can be made of any desired material sufficient to provide the desired media utilization. For example, flow controller 16 can be made of materials such as, but not limited to, polypropylene (PP), acrylonitrile butadiene styrene (ABS), polystyrene (PS), polyvinyl chloride (PVC), thermoplastic elastomer (TPE), stainless steel, others, and combinations thereof.

Referring now to FIG. 9, a performance comparison of purification devices 10 having three different embodiments flow controllers 16 according to the present disclosure as compared to a base line using a prior art purification device without any integral flow controller. The flow controllers used are illustrated in FIG. 9 and are labeled as flow controller 2, flow controller 3, and flow controller 4.

The open area of the three flow controllers 16 were varied. In each test, water having a total dissolved solid (TDS) level of 115 parts per million (ppm) was passed through system 20 at a flow rate of 1.5 gallons per minute (gpm) or 5.68 liters per minute (LPM) until water exiting the system was measured to have TDS level above 20 ppm. During the test, measurements of the TDS of the incoming water and the gallons of water processed were taken to calculate a number of grains of solids removed. Here, the term "grains" is one known unit for measuring TDS with 1 being defined as of 1 milligram dissolved in 1 liter of water. For ease of comparison, the results are reported in both liters of water and grains.

A comparison of the grains or removal efficiency and the liters processed of the purification devices 10 having the three different flow controllers 16 illustrated in FIG. 9 were then compared to the baseline. Here, it can be seen that efficiency improvements of between 15% and 19% over the baseline were achieved.

Figure 10:
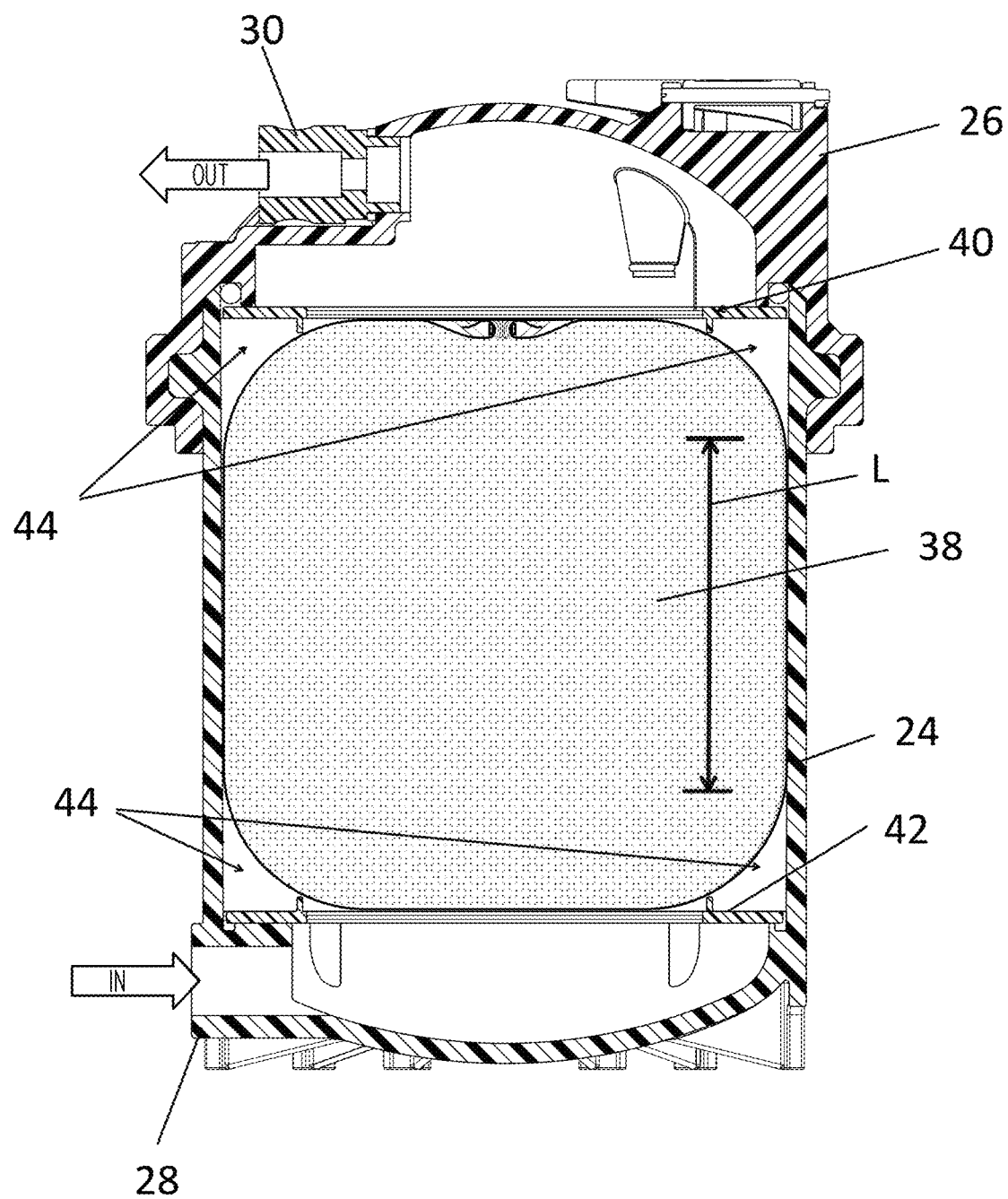
FIG. 10 is a schematic depiction of a prior art water purification device in use with a prior art pure water system.

FIG. 10 illustrates the use of the prior art purification device 38 without any integral flow controller in system 20. Here, system 20 includes stationary or fixed upper and lower diffuser plates 40, 42. Of course, it is contemplated by the present disclosure for purification device 10 to find equal use with system 20 that includes no diffuser plates, only upper plate 40, only lower plate 42, and with upper and lower diffuser plates of the same or different construction. Moreover, it is contemplated by the present disclosure for upper plate 40 and/or lower plate 42 to include or lack the filter membrane or mesh of those prior art devices. Without wishing to be bound by any particular theory, it is believed by the present disclosure that the prior art purification device 38 results in gaps 44 forming in all corners of tank 24. Gaps 44 reduce a length of contact (L) between the purification device 38 and tank 24.

Figure 11:
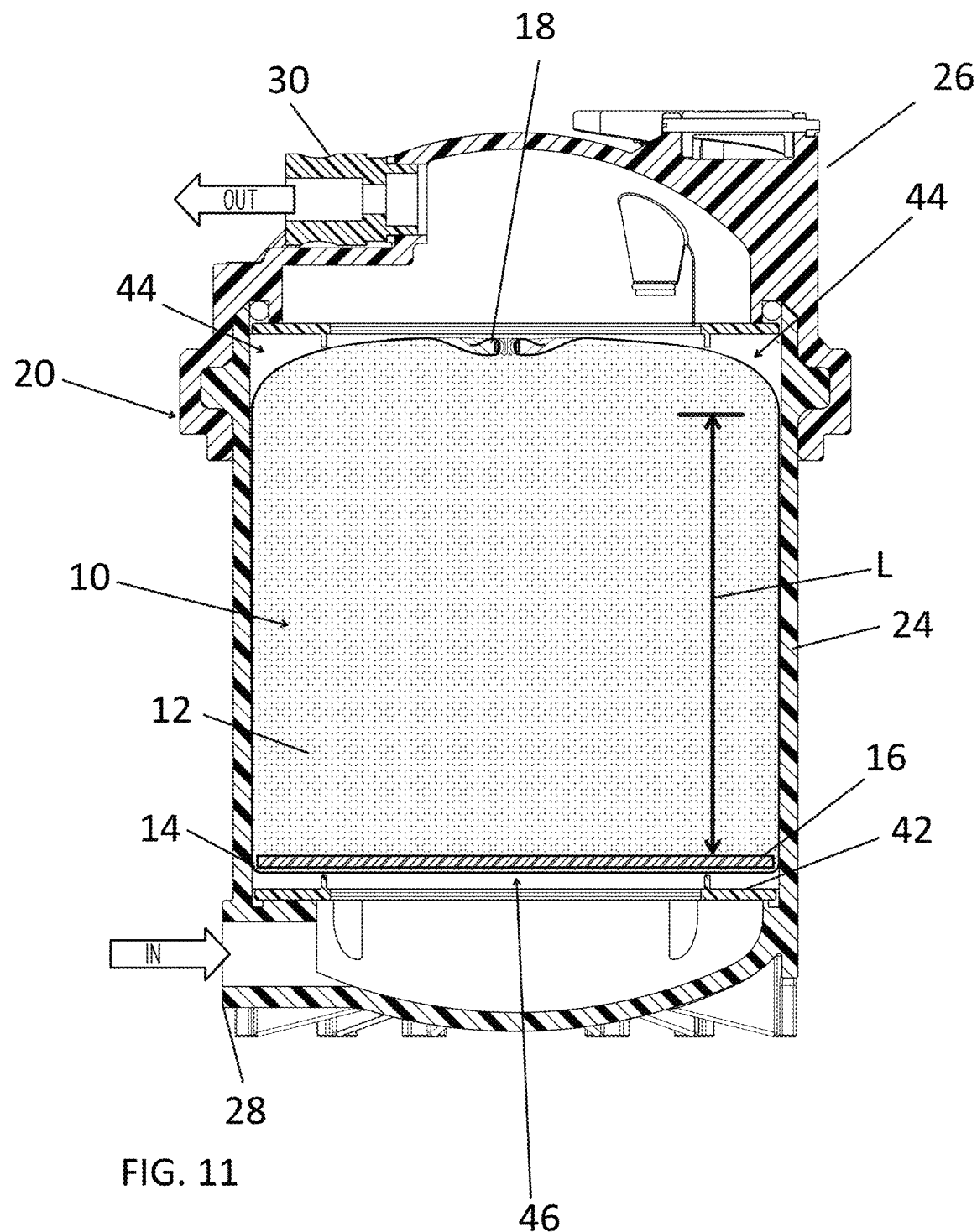
FIG. 11 is a schematic depiction of a water purification device according to the present disclosure in use with a prior art pure water system when the purification media is fresh.
Figure 12:
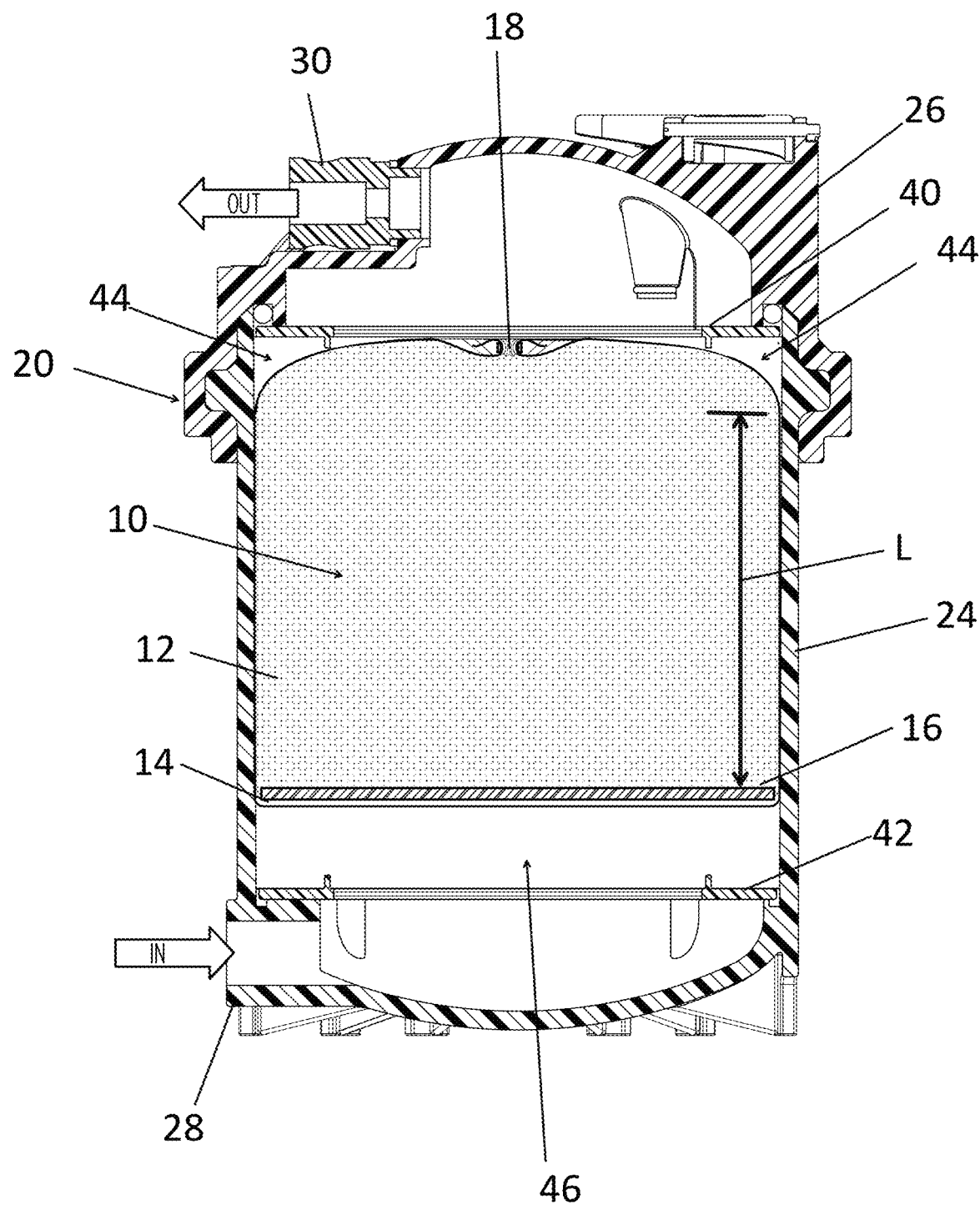
FIG. 12 is a schematic depiction of the water purification device of FIG. 11 when the purification media is spent.

FIGS. 11 and 12 are schematic depictions of purification device 10—having integral flow controller 16 inside of container 14 at the bottom of the container—in use with system 20 when purification media 12 is fresh (FIG. 11) and spent (FIG. 12). Here, it can be seen that the volume of media 12 decreases as the media is consumed or spent. Advantageously, flow controller 16 is believed to prevent or mitigate gaps 44 (FIG. 10) from forming at the bottom of the container. Elimination or mitigation of gaps 44 increases the length of contact (L) between the purification device 10 and tank 24 as compared to the prior art.

Further and when used in combination with fixed upper and lower diffuser plates 40, 42, flow controller 16 is believed to allow a distribution cavity 46 to form between diffuser plate 42 and flow controller 16 to further improve distribution of water through purification device 10.

Figure 13:
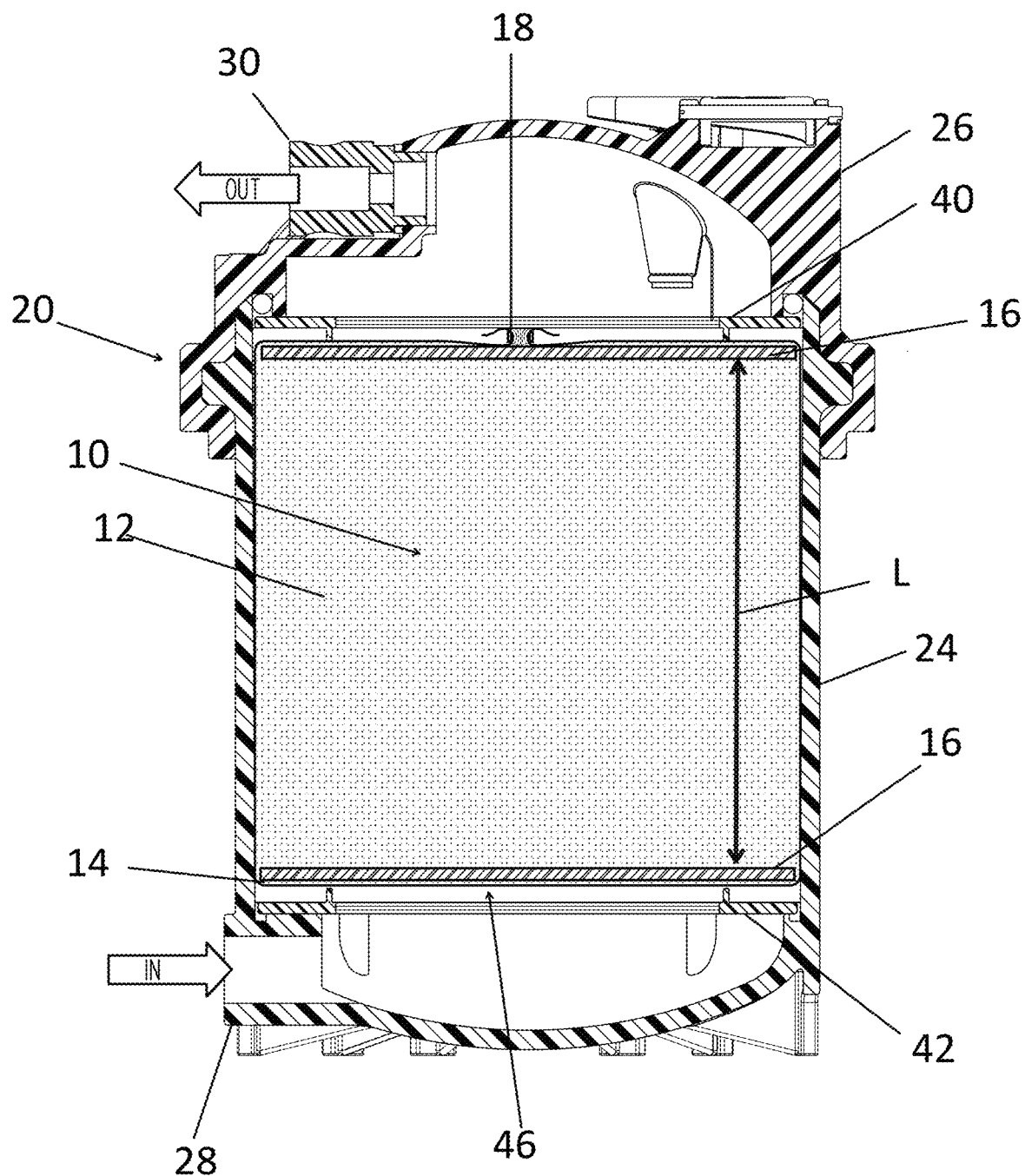
FIG. 13 is a schematic depiction of another embodiment of a water purification device according to the present disclosure in use with a prior art pure water system when the purification media is fresh.
Figure 14:
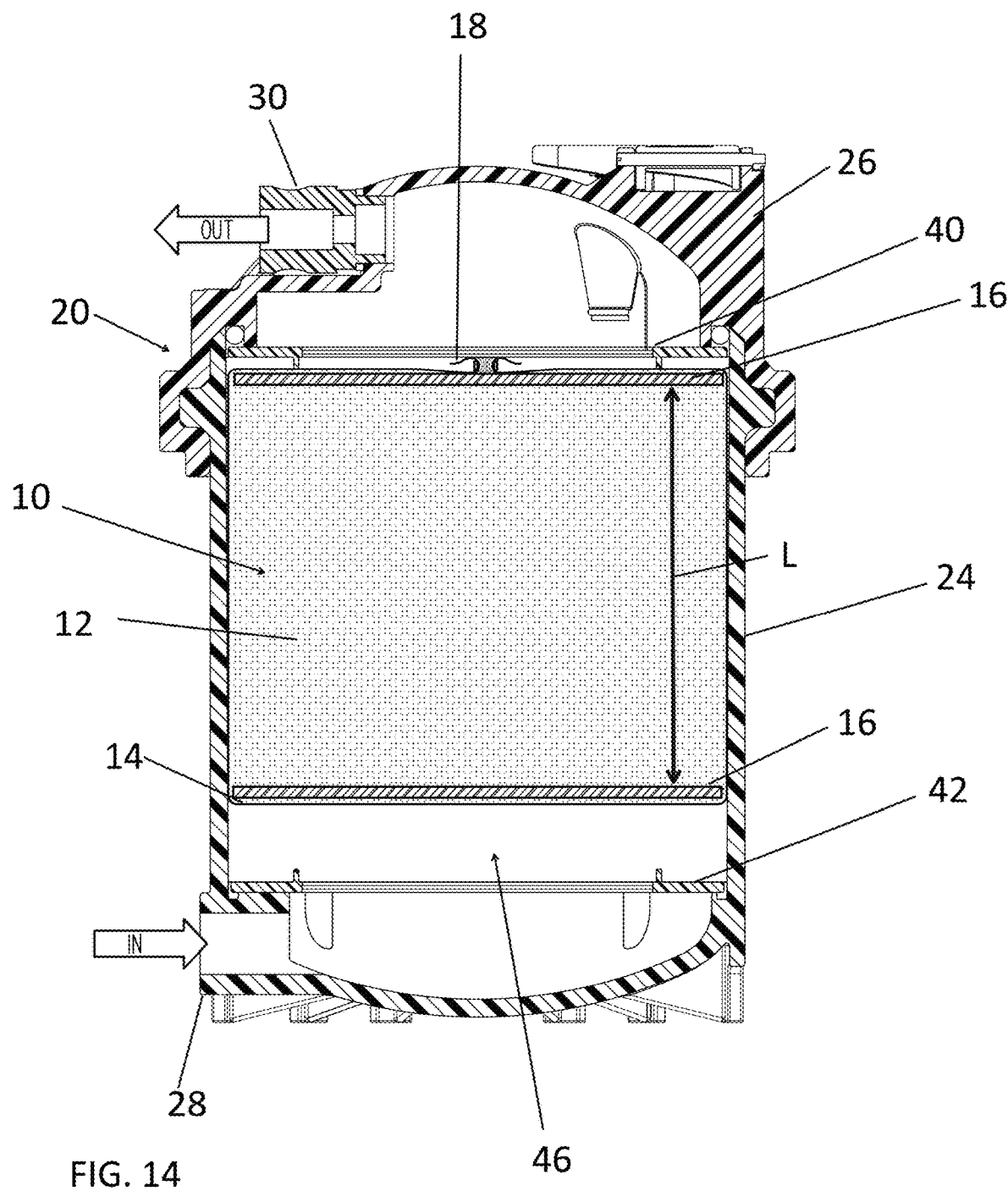
FIG. 14 is a schematic depiction of the water purification device of FIG. 13 when the purification media is spent.

FIGS. 13 and 14 are schematic depictions of purification device 10—having integral flow controller 16 inside of container 14 at both the top and bottom of the container—in use with system 20 when purification media 12 is fresh (FIG. 13) and spent (FIG. 14). Here, it can be seen that the volume of media 12 decreases as the media is consumed or spent. Advantageously, flow controller 16 is believed to prevent or mitigate gaps 44 (FIG. 10) from forming at the bottom and top of the container. Elimination or mitigation of gaps 44 further increases the length of contact (L) between the purification device 10 and tank 24 as compared to the prior art.

Further and when used in combination with fixed upper and lower diffuser plates 40, 42, flow controller 16 is believed to allow a distribution cavity 46 to form between diffuser plate 42 and flow controller 16 to further improve distribution of water through purification device 10.

Accordingly, purification device 10 of the present disclosure—namely media 12, container 14, and integral flow controller 16—has been found to provide a simple, yet effective way to improve the utilization of the media while remaining easy to load and unload from system 20.

Referring now to FIGS. 15-23, another exemplary embodiment of a purification media device 110 according to the present disclosure is shown. Here, component parts performing similar or analogous functions are labeled in multiples of 100 to the prior embodiments.

Figure 15:
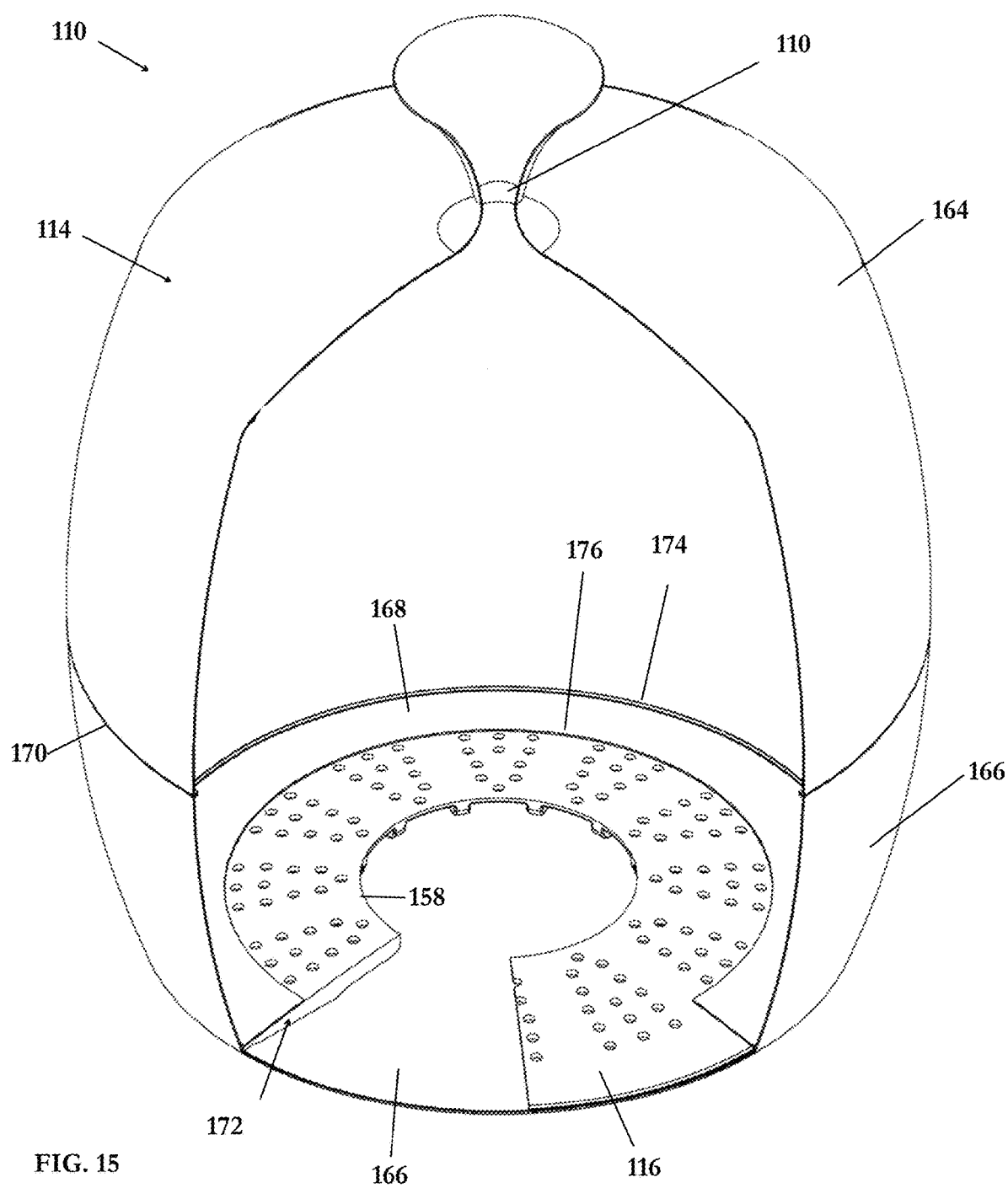
FIG. 15 is a top partially sectioned perspective view of another exemplary embodiment of a water purification device according to the present disclosure.
Figure 16:
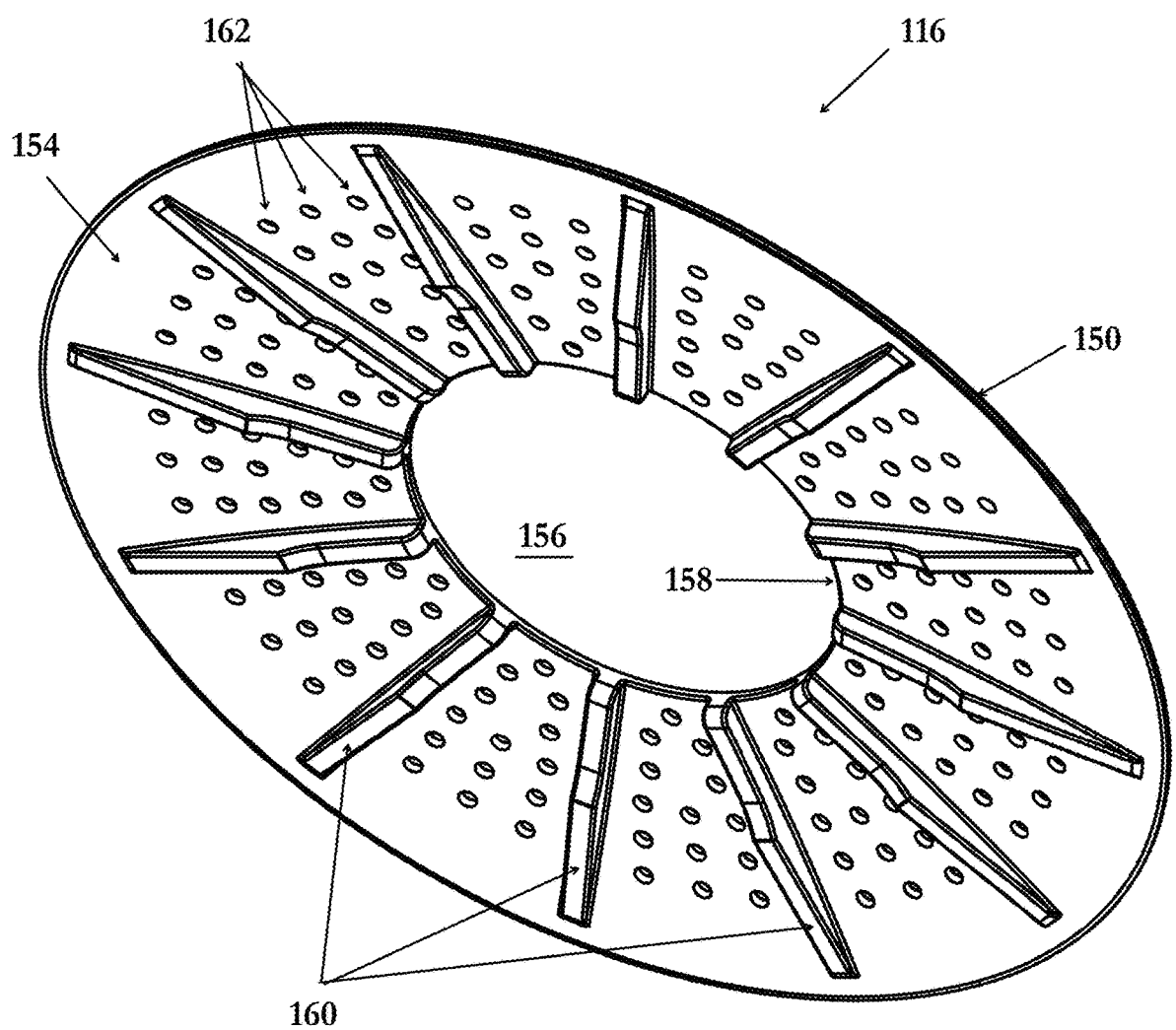
FIG. 16 is a bottom, perspective view of an exemplary embodiment of a flow controller according to the present disclosure for use with the water purification device of FIG. 15.
Figure 17:
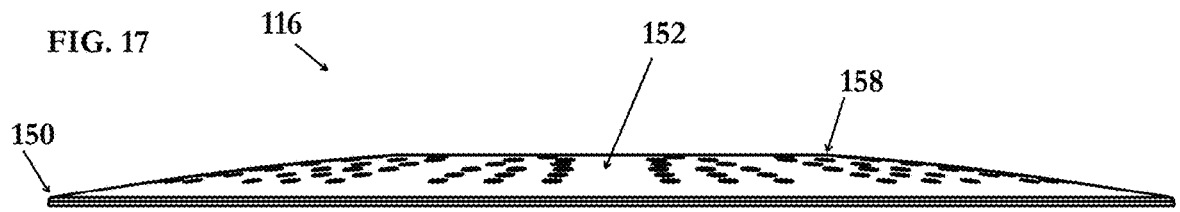
FIG. 17 is a side view of the flow controller of FIG. 16.
Figure 18:
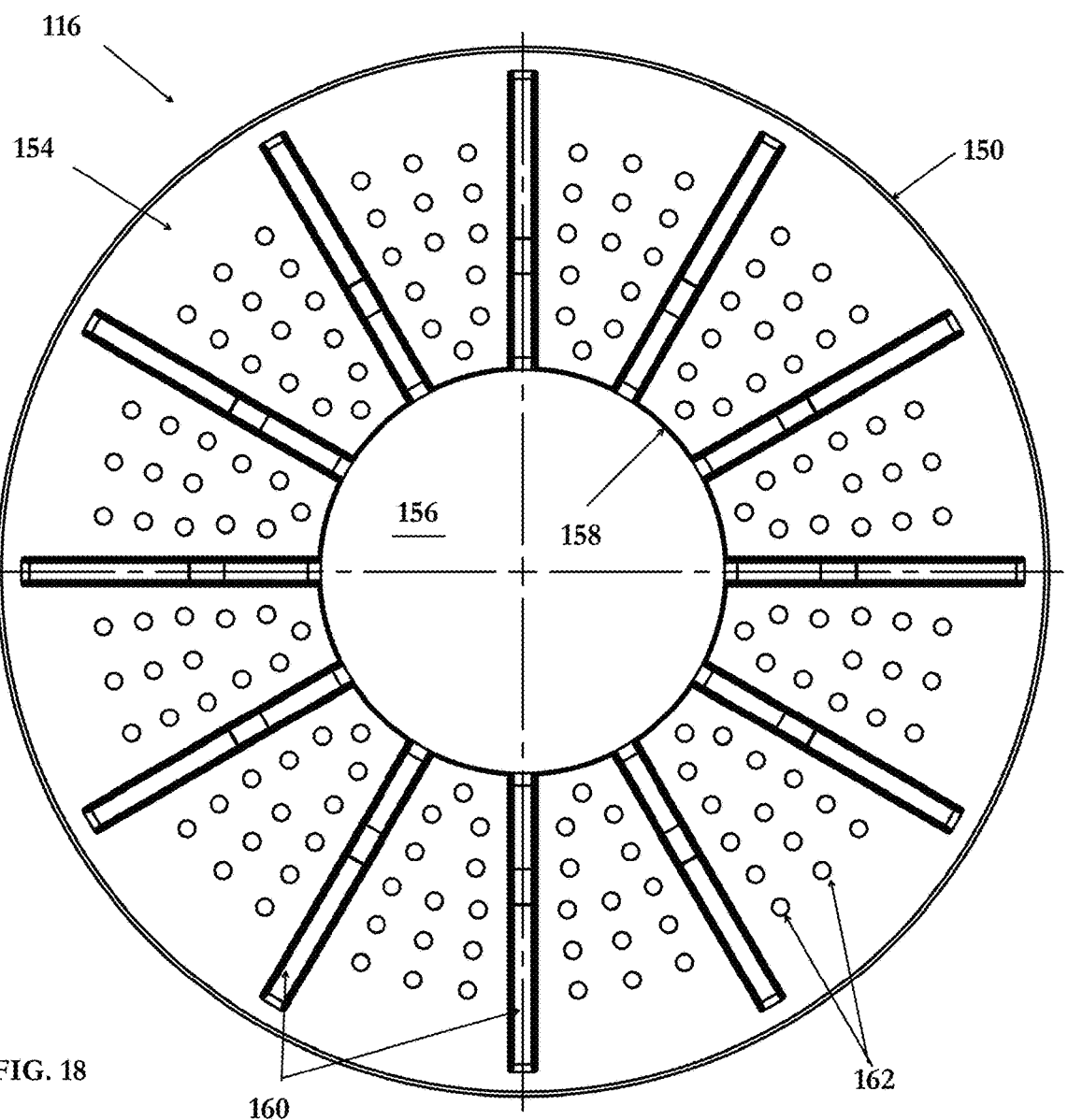
FIG. 18 is a bottom view of the flow controller of FIG. 16.
Figure 19:
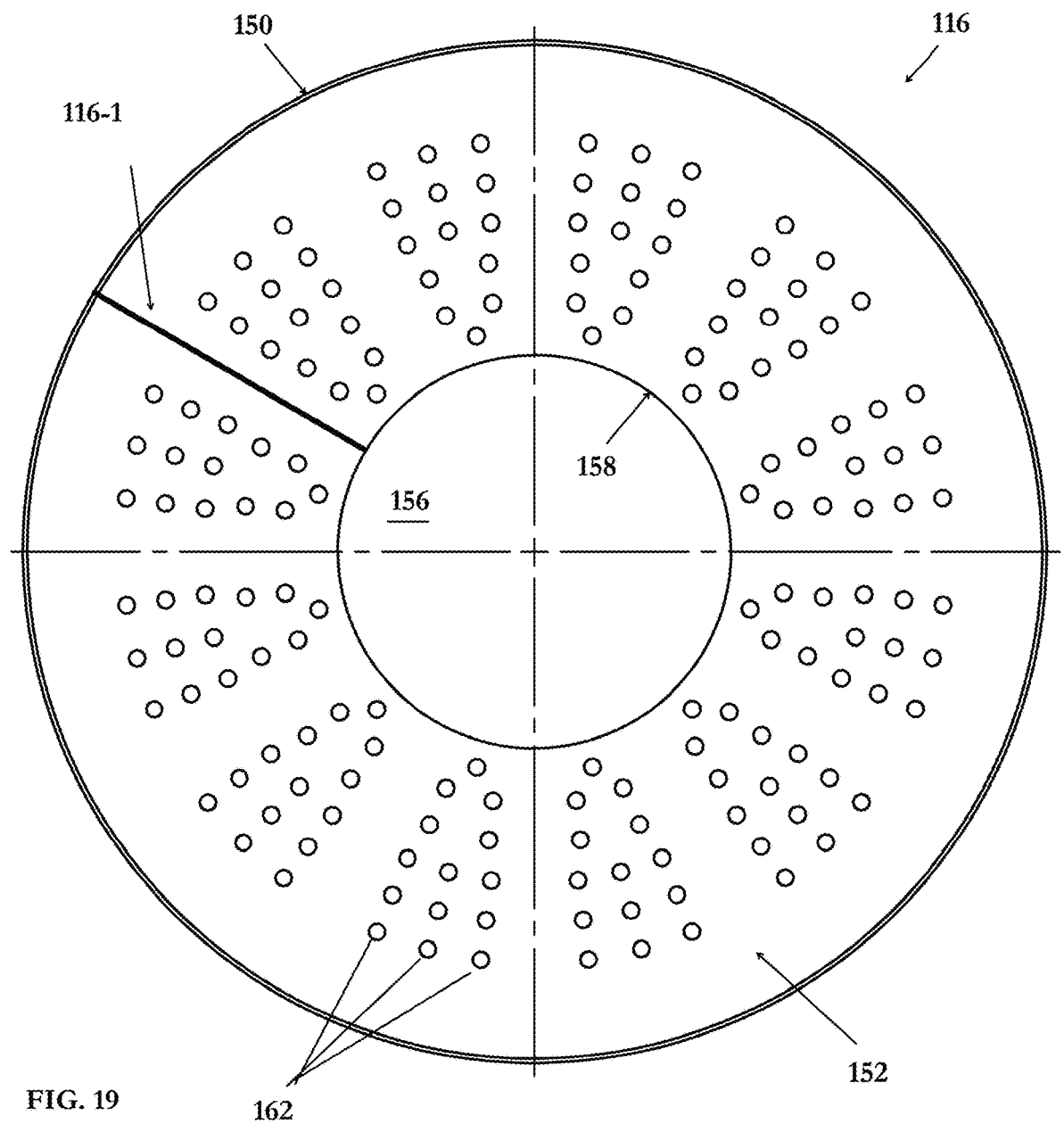
FIG. 19 is a top view of the flow controller of FIG. 16.
Figure 22:
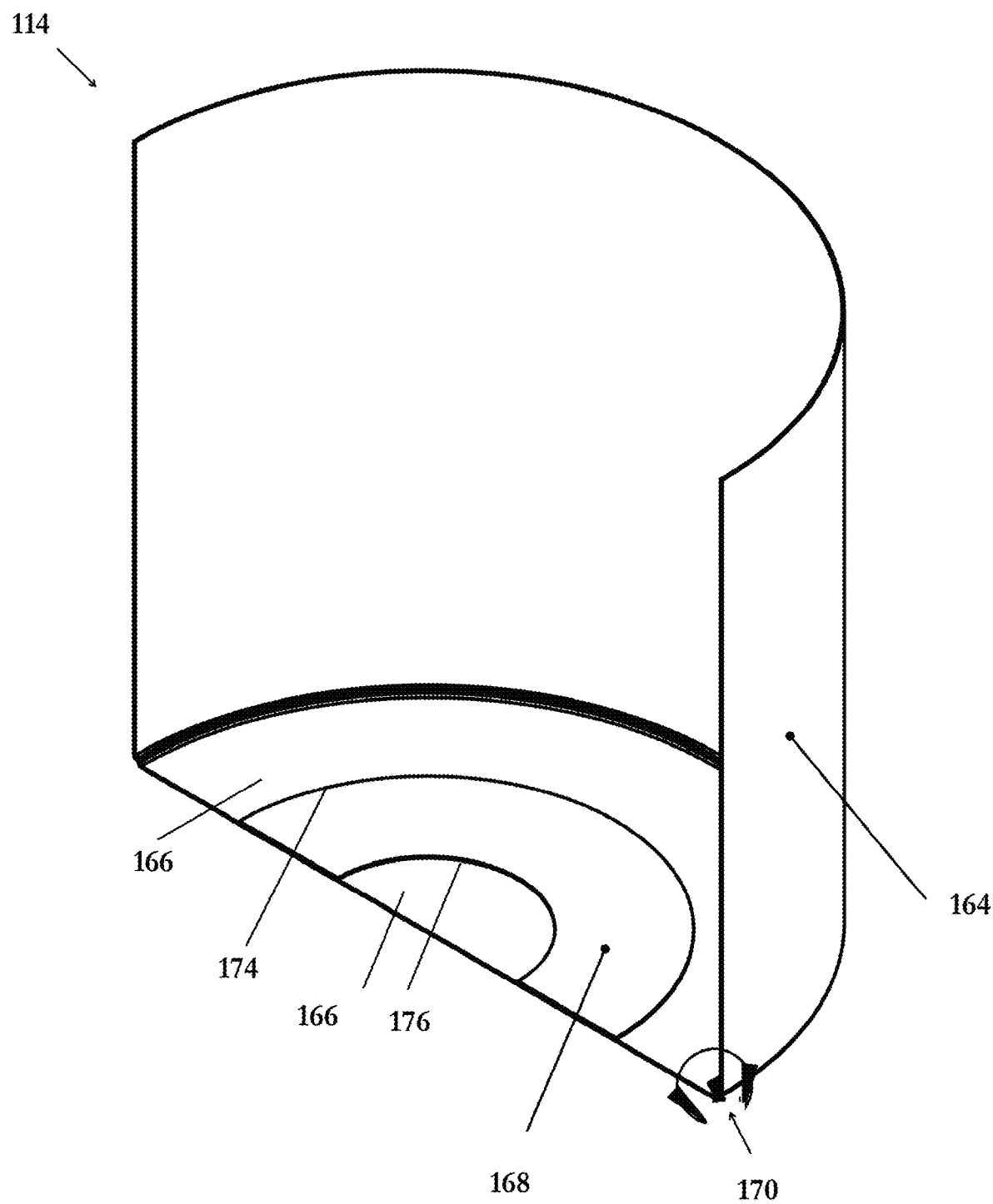
FIG. 22 is a sectional view of the container of FIG. 15 before filling with resin and before closing.

Purification device 110 includes purification media 112 contained within porous container 114 and has integral flow controller 116. In some embodiments, container 114 includes closure 118 securing the media 112 in the container. In other embodiments, porous container 114 is an elastic porous container. Device 110 is shown in FIG. 15 with lower portions of container 114 shown as partial cross section to allow viewing of controller 116.

As discussed above, device 110 having integral flow controller 116 maximizes the utilization of media 112 by providing one or more of a flow pattern, compressive forces, increase a length (L) of contact between container 114 and tank 24, a desired porosity at the water entrance side of container 114, a desired stretch of container 114 regardless of the volume or depletion amount of media 112, fit of outer diameter of flow controller 116 to inner diameter of tank, and other benefits.

Flow controller 116 is considered to be integral with container 114 by virtue of the controller residing within the container at a lower interior surface of container 114, with respect to the flow direction. Of course, it is contemplated by the present disclosure for the specific position of controller 116 to be at an upper interior surface of container 114, at both the upper and lower surfaces, at any location between the upper and lower surfaces, and any combinations thereof.

Controller 116 is contemplated for use with systems including fixed upper and lower diffuser plates 40, 42 for at least the reasons discussed above—as well as with systems having no diffuser plates or fixed diffuser plates at only the upper or only lower positions.

While device 110 can find use with any of the flow controllers disclosed here, an exemplary embodiment of a flow controller 116 for use with device 110 is shown in FIGS. 16-19.

Controller 116 has a generally frustoconical shape tapering upward from a lower outer edge 150. Controller 116 has an upper face 152 and a lower face 154 and, may be installed in device 110 so that lower face 154 is towards the direction of flow (A).

In some embodiments, controller 116 has a central opening 156 such that the controller tapers from outer edge 150 to edge 158 of the opening. Central opening 156 can have an inner diameter (located at edge 158) that may be between 10% and 90% of the outer diameter (located at edge 150) of the controller, may be between 20% and 60%, or with about 30% to 50% being desired, and any subranges therebetween.

Controller 116 can include one or more ribs 160 defined on lower face 154. Ribs 160 can provide structural rigidity to controller 116 and/or can guide the flow of water into/through central opening 156. It is noted that controller 116 lacks any pivot preventers discussed above—whereas it has been determined that, in some embodiments—the integral nature and shape of the controller 116 is sufficient to maintain the controller substantially perpendicular to the primary flow axis (A).

Additionally, controller 116 can include a plurality of openings 162—in the form of slots and/or holes—at any desired location or pattern to provide the desired flow through device 110.

In this manner, controller 116 multiple zones of differing flow restriction. For example, central opening 156 can be thought of as a zone of very low flow restriction through controller 116, while the remaining portions of the controller can be thought of as zones of higher levels of flow restriction as compared to the zone of the central opening. Further when controller 116 includes openings 162, this area can be thought of as a zone of a middle level of flow restriction through the controller as compared to the zone of opening 156. Finally, controller 116 can include regions that lack any openings 162 in the region proximate outer edge 150 can be thought of a zone of highest level of restriction. Simply stated, controller 116 has at least two, but in some embodiments may have at least three zones of differing flow restriction—where the center of the controller has the lowest level of restriction (i.e., offers the highest level of flow) and outer edge 150 of the controller has the highest level of restriction (i.e., offers the lowest level of flow).

It should be recognized that controller 116 is described above by way of example only as having zones of flow restriction that are lowest in the center and highest at the outer edge 150. Of course, it is contemplated by the present disclosure for controller 116 to have any desired order or number of zones that are configured to control the flow of fluid into/through media 112 so as to improve the utilization of the media taking into account one or more variables such as, but not limited to, tank inner diameter, tank aspect ratio, number of tank sections, flowrate, media type, TDS of incoming and/or outgoing water, and others.

In some embodiments where controller 116 is configured for use with system 20—which has an internal diameter of 200 mm, the controller can have an outer diameter at edge 150 of between 160 mm and 240 mm, or between about 180 mm to 200 mm, with 192.5 mm being desired, and any subranges therebetween. In this manner, controller 116 has outer diameter that is within ±20%, or within −10% to 0%, with about −4% of the inner diameter of the system being desired, and any subranges therebetween. In embodiments where controller 116 has an outer diameter that is larger than the inner diameter of system 20, the controller can have one or more resiliently flexible outer regions that are deformed when installed in the system.

In some embodiments, controller 116 can be in the form of a split ring, namely include a slit 116-1 running through the controller from edge 150 to edge 158 that allows the controller to be resiliently compressed to a smaller outer diameter for securement in container 114. Here, one or more edges of slit 116-1 can include a feature (e.g., a tongue and groove feature) that, when engaged, prevents compression of controller 116 to the smaller diameter once installed in container 114.

It should be recognized that controller 116 is disclosed without the need for pivot preventers 32 discussed above. However, it is contemplated by the present disclosure for controller 116 to have any of the features disclosed above with respect to controller 16—or for controller 16 to have any of the features disclosed with respect to controller 116.

Container 114 and the interaction between the container and controller 116 is described in more detail with reference to the exemplary embodiment illustrated in FIGS. 20-23. Here, container 114 is illustrated having a three-piece construction that includes a cylindrical wall panel 164, a circular bottom panel 166, and a retaining panel 168.

Panels 164, 166, 168 may be formed of a porous material that is resilient or elastomeric and may be made of the same material. However, it is contemplated by the present disclosure for panels 164, 166, 168 to be made of different materials with—for example different porosity and/or elasticity.

Cylindrical wall panel 164 lacks any seams that run along the primary flow direction (A)—namely from the bottom to the top of the container. Bottom panel 166 and cylindrical wall panel 164 are secured to one another along an internal seam 170. In some embodiments, internal seam 170 is formed by polyester yarn (not shown). Of course, it is contemplated by the present disclosure for internal seam 170 to be any desired joining method such as, but not limited to, welds, adhesives, and others. Regardless of how formed, seam 170 may be provided in a manner that allows container 114 to remain elastic at the seam.

In the illustrated embodiment, bottom panel 166, cylindrical wall panel 164, and seam 170 are configured, via the materials, shapes, and sizes, so that—once container 114 is filled with media 112 and controller 116—the seam is located as shown in FIG. 15, partially up the side wall. Of course, it is contemplated by the present disclosure for container 114 to have seam 170 at any location provided that cylindrical wall panel 164 lacks any seams that run along the primary flow direction (A). Further, it is contemplated that multiple materials can be used for panels 164, 166 such that device 110 includes multiple seams 170 at different locations.

Moreover, it should be recognized that container 114 is described by way of example has having panels 164, 166, and 168 formed separately then joined together. However, it is contemplated by the present disclosure for at least panels 164 and 168 of container 114—and in some embodiment panel 168—to be formed from single panel such as those made using known circular knitting techniques.

Retaining panel 168 is secured to bottom panel 166 so as to form a pocket 172 into which controller 116 is secured. In an embodiment, controller 116 is held in pocket 172 by the elastic properties of container 114. In the illustrated embodiment, retaining panel 168 has an outer edge 174 and an inner edge 176—where the outer edge is secured to bottom panel 166 and the inner edge remains unsecured to the bottom panel forming pocket 172 therebetween.

Retaining panel 168 has an unstretched outer diameter—defined at outer edge 174—that is smaller than the outer diameter—defined at outer edge 150—of the controller 116. In this manner, insertion of retaining panel 168 into pocket 172 stretches bottom and retaining panels 166, 168 to hold controller 116 in pocket. Retaining panel 168 has an unstretched outer diameter that is at least 10% less that the outer diameter of controller 116, or may be at least 40% less, or may be at least 60% less being desired. In one embodiment, retaining panel 168 has an unstretched outer diameter of 110 mm and finds use with controller 116 having an outer diameter of 192.5 mm. Thus, effect of installing controller 116 into pocket 172 is that the portion of bottom panel 164 inside of outer edge 174 of retaining panel 168 is also stretched at least 10%, or may be at least 40% less, or may be at least 60% less being desired. Furthermore, device 110 is configured so that the stretch of bottom panel 166—at least in the region of controller 116—is independent of the amount of resin in container 114 and/or the depletion level of the resin in the container.

In some embodiments, container 114 can be assembled by turning the container inside out, installing controller 116 in pocket 172, then returning the container to its normal orientation before filling with media 112 and closing with closure 118.

When controller 116 is installed in pocket 172, retaining panel 168 can have an inner diameter, defined at inner edge 176, that is small enough to ensure that openings 162 and central opening 156 in the controller remain unrestricted by the retaining panel. However and depending on the flow restriction characteristics desired, it is contemplated by the present disclosure for inner edge 176 cover openings 162, and in other embodiments central openings 156. Simply, it is contemplated by the present disclosure for retaining panel 168 to—in its most restrictive form—to have a sufficiently sized opening to allow insertion of controller 116.

Advantageously, device 110 via the interconnection of container 114 and controller 116 is configured to stretch bottom panel 166 consistently to a predefined amount. Bottom panel 166 is the area of entry for water into device 110. The amount of stretch applied to the fabric of bottom panel 166 effects the porosity of this entry point. It has been determined by the present disclosure that stretching bottom panel 166 consistently to the predefined amount provides maximization of media 112 utilization by providing a lowest level of fluid restriction into/through device 110 at the water entry side.

It should be recognized that device 110 is disclosed above by way of example as having controller 116 in bottom panel 166—where that panel is the water entry side of the device. However, it is contemplated by the present disclosure for device 110 to be arranged so that bottom panel 166 is the water exit side. Further, it is contemplated by the present disclosure for device 110 to have controller 116 integrated at both the water entry and water exit side. In short, device 110 can have controller 116 at the water entrance side (which can be the bottom or top of the device), at the water exit side (which can be the bottom or top of the device), or at both the water entrance and exit sides.

Without wishing to be bound by any particular theory, it is believed that compressive forces on media 112 minimizes movement of the individual resin beads within container 114 before, during, in between uses, and after use. It is believed that maintaining of media 112 in a compressed state within container 114 and/or system 20 as the media changes in volume due to depletion, at least in part, maximizes the use or consumption of media. However, this can be made particularly difficult as it has been determined by Applicant that media 112, when depleted has a reduced volume. In some embodiments, media 112 can experience a reduction in volume of up to 20%—but of course more or less volume reduction is contemplated by the present disclosure.

In some embodiments, device 110 is formed of material sufficient to maintain media 112 under compression even after being used or spent.

Additionally, device 110 is configured so that controller 116 maintains the predetermined stretch of bottom panel 166—at least in the region of the controller—after media 112 has been used or spent.

Accordingly, purification device 110 of the present disclosure—namely media 112, container 114, and integral flow controller 116—has been found to provide a simple, yet effective way to improve the utilization of the media while remaining easy to load and unload from system 20.

Referring to FIGS. 24A-G, FIGS. 25A-G, FIGS. 26A-G, and FIG. 27 illustrate the results of resin usage tests that were performed to determine the water flow through the system and, thus, to compare media usage. A total of five tests are compared in FIG. 27, these tests are identified as Test 1, Test 1a, Test 2, Test 2a, and Test 3 with the results being reported in both liters and grains.

Test 1 and Test 2 are simply reported herein as they were performed in Applicant's own U.S. Ser. No. 14/684,071. Test 1a is a retest of the Test 1, Test 2a is a retest of Test 2. It is noted that the difference in results between Tests 1/1a and 2/2a are believed to be attributable to differences in the resin. Thus, Test 1a, 2a, and 3 were performed using resin from the same manufacturing lot to reduce the impact of resin differences—manufacturer-to-manufacturer and/or lot-to-lot—on the results of FIG. 27.

During the Test 1a, the pure water system used is Applicant's commercially available HydroPower® system—which includes a static diffuser inside of the system and a container, which is described in Applicant's own U.S. Ser. No. 14/684,071.

Figure 23:
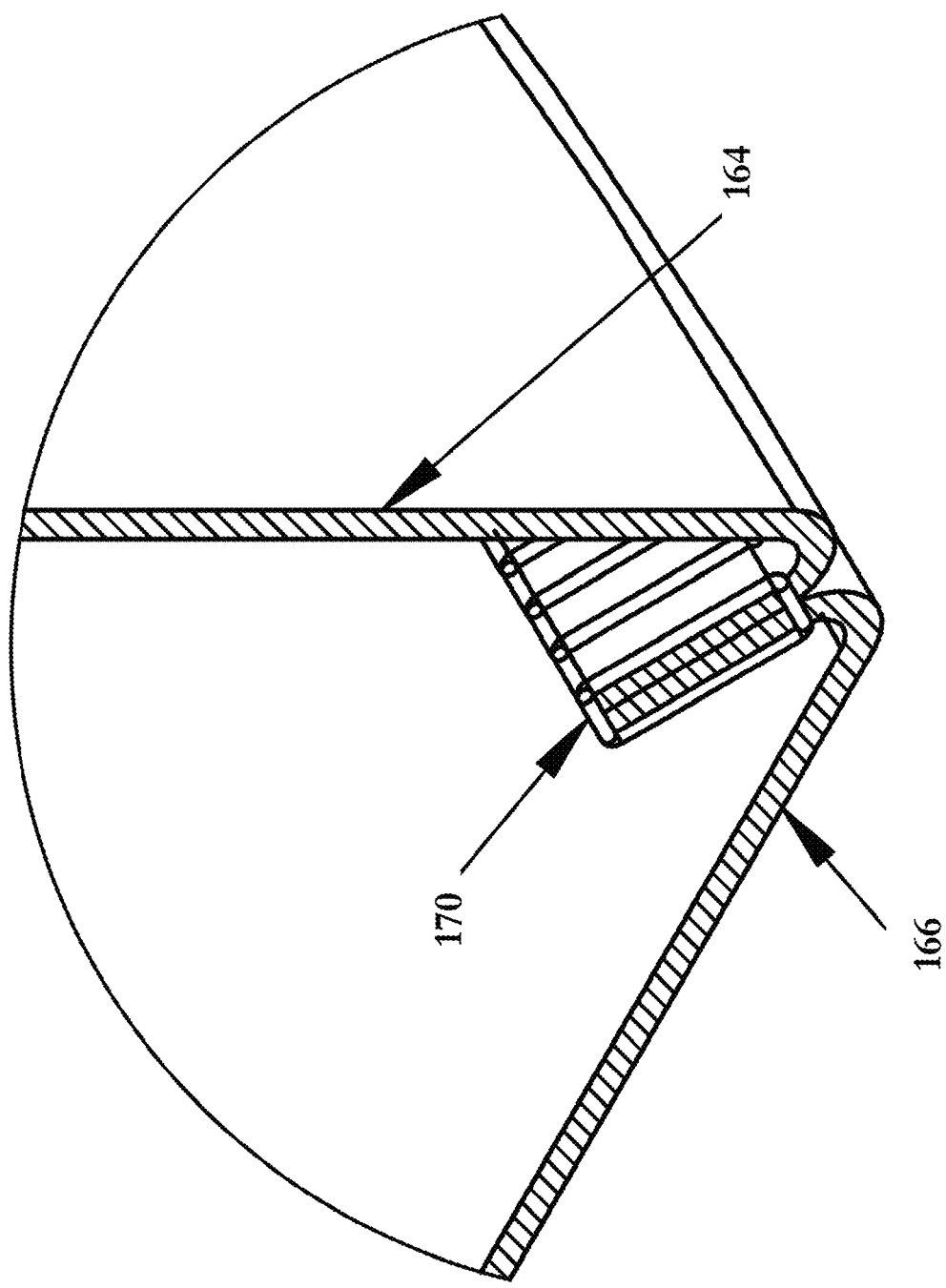
FIG. 23 is an enlarged view of a bottom seam of the container of FIG. 22.

During Test 2a, the pure water system used was the dynamic diffuser shown in FIG. 23 of and the system shown in FIG. 1 of Applicant's own U.S. Ser. No. 14/684,071.

During the Test 3, system 20 of FIG. 1 was used together with water purification device 110 of FIGS. 15-23, which includes the integral controller 116.

Thus, the three tests performed compare the results of a static diffuser (Tests 1/1a), a dynamic diffuser (Tests 2/2a), and integrated flow controller 116 (Test 3).

During Tests 1 and 2, the media was a mixed bed resin of a color changing resin commercially available from Purolite®. During Tests 1a, 2a, and 3, the media was a mixed bed resin of a color changing resin commercially available from Resin Tech, Inc. sold as part number MBD30. In all tests, the fresh or un-used color changing resin has a dark (e.g. purple) color that lightens to a light (e.g., yellow) color when depleted or used. It is noted that the darker yellow regions in the figures do not represent different resin usage, but rather is an indication of water saturation.

Water of a known particulate level, namely 400 parts per million (ppm), was fed to the systems at a known flow rate of about 6 liters per minute. Since it is impossible to dictate the quality of the incoming water, the water used during the tests was controlled to 400 ppm using known chemical injection techniques that combines tap water with a mixture of 4 parts calcium chloride and 1 part magnesium sulfate.

Figure 24A:
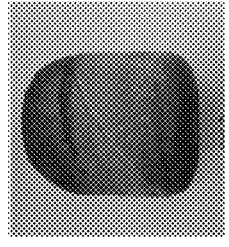
FIG. 24A-24G are images of a resin usage test using a prior art water purification device.
Figure 26A:
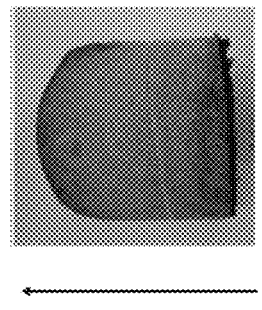
FIG. 26A-26G are images of a second resin usage test using the water purification device of FIGS. 15-23.

Water exiting the systems was tested for its particulate load with the test being stopped when the media within the system was no longer able to provide water of a desired particulate level—in this case 20 ppm. The water flow was then stopped and system was placed in a freezer to freeze the resin of media in position. After frozen, the systems were cut away to provide the media in a solid mass (FIGS. 24A, 25A, 26A). These solid masses were then sectioned at regular intervals, namely into six intervals in FIGS. 24B-24G, 25B-25G, and 26B-26G, respectively.

Figure 24B:
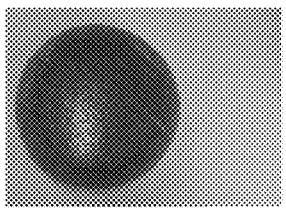
Figure 24C:
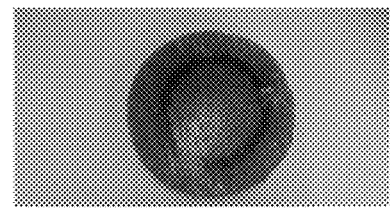
Figure 26B:
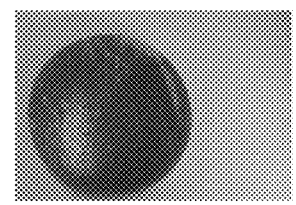
Figure 26C:
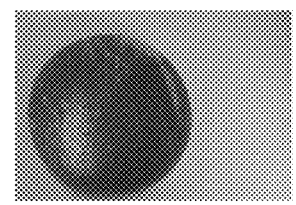

It is noted that the sections were approximately defined at the common locations along the flow direction such that FIGS. 24B, 25B, and 26B each represent approximately a common location, FIGS. 24C, 25C, and 26C each represent approximately a common location, and so on. In this way, comparison of the resin usage can be seen by visual comparison of the test results at these common locations.

It is also noted that the testing in all of these tests include normal variations that can be expected when measuring the removal of solids from running water on an ionic basis. The testing was performed to minimize differences by holding constant attributes such as, but not limited to, resin type/lot, temperature, incoming water quality, flow rates, and others.

FIG. 24A illustrates the prior art media as a solid mass of frozen media after completion of Test 1a and before being sectioned. FIGS. 24B-24G show the solid mass of media after completion of Test 1a and in sectioned form. Here, FIG. 24B represents sections at the bottom of the solid mass, namely where the test water entered the container. Conversely, FIG. 24G represents the section of the frozen media at the top of the solid mass, namely where the test water exited the container. Thus, the flow direction (F) of water through the media during Test 1a was from the bottom (FIG. 24B) to the top (FIG. 24G).

Figure 24D:
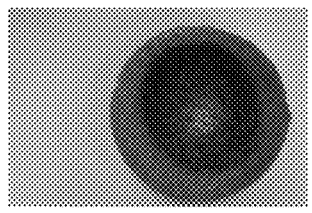
Figure 24E:
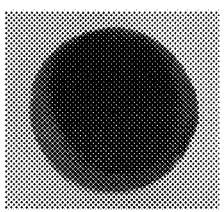
Figure 24F:
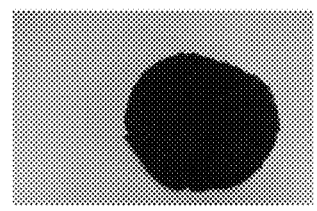
Figure 24G:
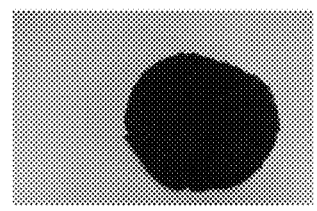

It can be seen that the media utilization when using the prior art static diffuser plate in FIG. 24B-24G initially results all media being spent in the first section of FIG. 24B, with a ring of unspent media in the second section of FIG. 24C, followed by a circular dark (purple) circle of unspent media throughout the center section and the light (yellow) outer rim of spent media in the next two sections of FIGS. 24D-24E, and then by increasing amounts of unspent media remaining in the four upper sections of FIGS. 24F-24G with not enough absorption of the media having occurred at the water exit so as to perceptually change the color of the media.

From FIG. 27, it can be seen that Test 1a provided 320 liters of 10 ppm water and 350 liters of 20 ppm water. Again, increases in the amount of purified water between Test 1 and Test 1a are attributed to differences such as, but not limited to, the resin being tested, water being tested, and equipment used.

FIG. 25A illustrates the prior art media as a solid mass of frozen media after completion of Test 2a and before being sectioned. FIGS. 25B-25G show the solid mass of media after completion of Test 2a and in sectioned form. Here, FIG. 25B represents sections at the bottom of the solid mass, namely where the test water entered the container. Conversely, FIG. 25G represents the section of the frozen media at the top of the solid mass, namely where the test water exited the container. Thus, the flow direction (F) of water through the media during Test 2a was from the bottom (FIG. 25B) to the top (FIG. 25G).

It can be seen that the media utilization provided by the prior art dynamic diffuser in FIG. 25B-25G initially results in all media being spent in the first two sections of FIGS. 25B-25C, followed by a circular dark (purple) circle of unspent media throughout the center section and the light (yellow) outer rim of spent media in the third section of FIG. 25D, and then by increasing amounts of unspent media remaining in the three upper sections FIG. 25E-25G with not enough absorption of the media having occurred at the water exit so as to perceptually change the color of the media.

From FIG. 27, it can be seen that Test 2a provided 353 liters of 10 ppm water and 384 liters of 20 ppm water. Again, increases in the amount of purified water between Test 2 and Test 2a are attributed to differences such as but not limited to, the resin being tested, water being tested, and equipment used. As discussed in the prior art and again illustrated in FIG. 27, the dynamic diffuser provides better utilization of the media than a static diffuser.

Unfortunately, it has been determined by the present disclosure that dynamic diffusers of the prior art—although effective at increasing resin utilization—are not optimal. In some examples, the dynamic diffusers prevent or hamper draining of water from the system after use. This can greatly increase the draining time during resin replacement—negatively effecting the ability of the user to quickly change the resin.

In other examples, the dynamic diffusers are difficult to maintain in a desired horizontal position during use, resulting in jams and leakage past the diffuser.

In still other examples, the user must manually move the dynamic diffuser within the system such as during installation or removal or when moving to a lowered position when replacing the media—which can prove difficult particularly in instances where multiple containers are used.

In still more examples, the manufacturing tolerances of such prior art dynamic diffusers have proven difficult to maintain a moving seal between the dynamic diffuser and the inner wall of the tank—while increasing the cost of such prior art diffusers.

Additionally, it has been found by the present disclosure that the prior art dynamic diffuser can provide restriction of flow through the system sufficient to reduce usable pressure of the outgoing water. For example, in instances when prior art systems are used with normal tap water pressure and used to clean exterior windows of multistory buildings, the dynamic diffuser can result in water flow restrictions that limit the use of the system by one or two stories as compared to prior art systems without such diffusers or systems of the present application having the integral flow controllers.

Advantageously, the integral flow controllers overcome these another other deleterious effects of the prior art while providing equal performance. Further, the integral flow controllers require less components—lacking the o-ring, mesh, and other components of the prior art.

FIG. 26A illustrates media as a solid mass of frozen media after completion of Test 3 and before being sectioned. FIGS. 26B-26G show the solid mass of media after completion of Test 3 and in sectioned form. Here, FIG. 26B represents sections at the bottom of the solid mass, namely where the test water entered the container. Conversely, FIG. 26G represents the section of the frozen media at the top of the solid mass, namely where the test water exited the container. Thus, the flow direction (F) of water through the media during Test 3 was from the bottom (FIG. 26B) to the top (FIG. 26G).

Figure 26D:
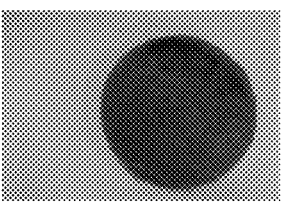
Figure 26E:
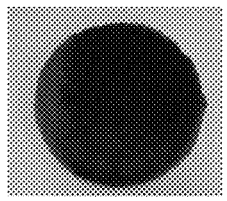
Figure 26F:
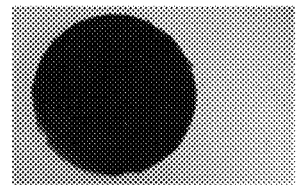
Figure 26G:
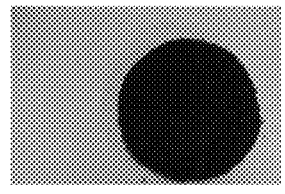

It can be seen that the media utilization when using integral controller 116 of the present application initially results in all media being spent in the first three sections of FIGS. 26B-26D, followed by increasing amounts of unspent media remaining in the three upper sections FIG. 26E-26G with not enough absorption of the media having occurred at the water exit so as to perceptually change the color of the media.

From FIG. 27, it can be seen that Test 3 provided 324 liters of 10 ppm water and 364 liters of 20 ppm water. Comparing Test 3 to Test 1a, it can be seen that the integral flow controller 116 of the present application provides about 25% more purified water at 10 ppm and about 20% more at 20 ppm then the static diffuser of the prior art. Comparing Test 3 to Test 2a, it can be seen that the integral flow controller 116 of the present application provides about 9% less purified water at 10 ppm and about 5% less purified water at 20 ppm as the dynamic diffuser of the prior art. However, the integral flow controller 116 avoids, overcomes, and/or mitigates the issues related to the use of dynamic diffusers. In short, device 110 of the present application provides only slightly less purified water as the prior art dynamic diffusers, but does so in manner that is significantly easier to use and manufacture, costs less to manufacture, and does not impact functionality (e.g., allows for 1-2 additional stories of washing pressure as compared to the prior art dynamic diffusers).

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the disclosure.

What is claimed is:

1. A pure water system, comprising:
a tank, a cover, an inlet port, and an outlet port configured to define a reservoir; and
a purification device received in the reservoir so that water can flow into the inlet port, through the purification device, and out of the outlet port along a primary axis of flow, wherein the purification device comprises a porous elastic container, purification media retained in the porous elastic container, and a flow controller configured and arranged within the porous container to stretch a water entry side of the porous elastic container at least 10% from an unstretched state.

2. The pure water system of claim 1, wherein the primary axis of flow is an upward flow direction.

3. The pure water system of claim 1, wherein the flow controller is at a water entry side of the porous elastic container, the water entry side being proximate the inlet port.

4. The pure water system of claim 1, wherein the purification media is compressibly retained in the porous elastic container.

5. The pure water system of claim 1, wherein the flow controller is completely inside the porous elastic container.

6. The pure water system of claim 1, wherein the flow controller is a rigid disk or has a frustoconical shape.

7. The pure water system of claim 1, wherein the flow controller is made of at least one of polypropylene (PP), acrylonitrile butadiene styrene (ABS), polystyrene (PS), polyvinyl chloride (PVC), thermoplastic elastomer (TPE), and stainless steel.

8. The pure water system of claim 1, wherein the flow controller is installed in a pocket of the porous elastic container.

9. The pure water system of claim 1, wherein the flow controller has one or more ribs defined on a lower face facing a portion of the porous elastic container.

10. The pure water system of claim 1, wherein the flow controller has a central opening that is between 10% and 90% of an outer diameter the flow controller.

11. The pure water system of claim 1, wherein the flow controller includes a plurality of water flow openings.

12. The pure water system of claim 1, wherein the flow controller has a zone of lowest restriction at a central region.

13. A pure water system, comprising:
a tank, a cover, an inlet port, and an outlet port configured to define a reservoir; and
a purification device received in the reservoir so that water can flow into the inlet port, through the purification device, and out of the outlet port along a primary axis of flow, wherein the purification device comprises a porous container, purification media retained in the porous container, and a flow controller comprising a pivot preventer configured to maintain the flow controller perpendicular to the primary flow axis.

14. The pure water system of claim 13, wherein the flow controller is completely inside the porous container.

15. The pure water system of claim 13, wherein the flow controller is a rigid disk or has a frustoconical shape.

16. The pure water system of claim 13, wherein the flow controller is made of at least one of polypropylene (PP), acrylonitrile butadiene styrene (ABS), polystyrene (PS), polyvinyl chloride (PVC), thermoplastic elastomer (TPE), and stainless steel.

17. The pure water system of claim 13, wherein the flow controller is installed in a pocket of the porous container.

18. The pure water system of claim 13, wherein the flow controller has one or more ribs defined on a lower face facing a portion of the porous container.

19. The pure water system of claim 13, wherein the flow controller has at least one of a central opening that is between 10% and 90% of an outer diameter the flow controller or a zone of lowest restriction at a central region.

20. The pure water system of claim 13, wherein the flow controller includes a plurality of water flow openings.

* * * * *